FIG_2
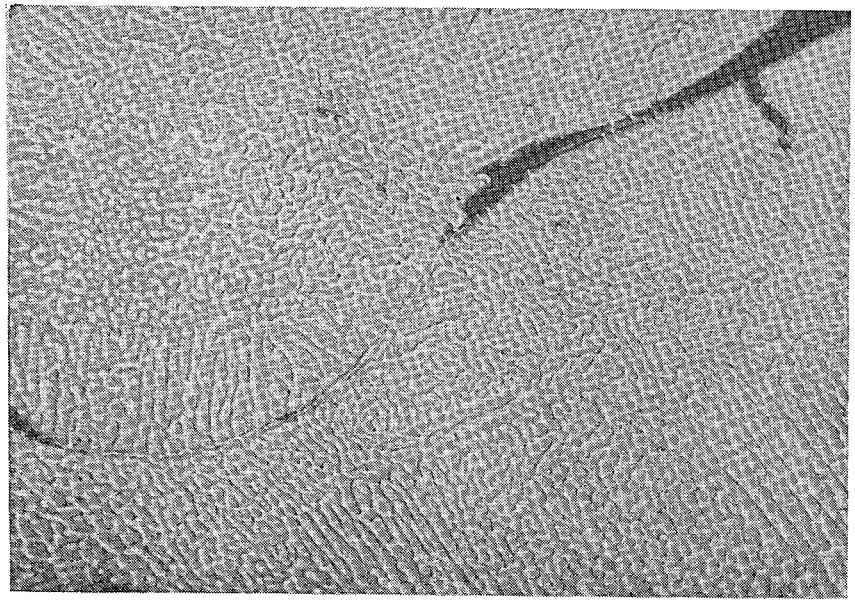

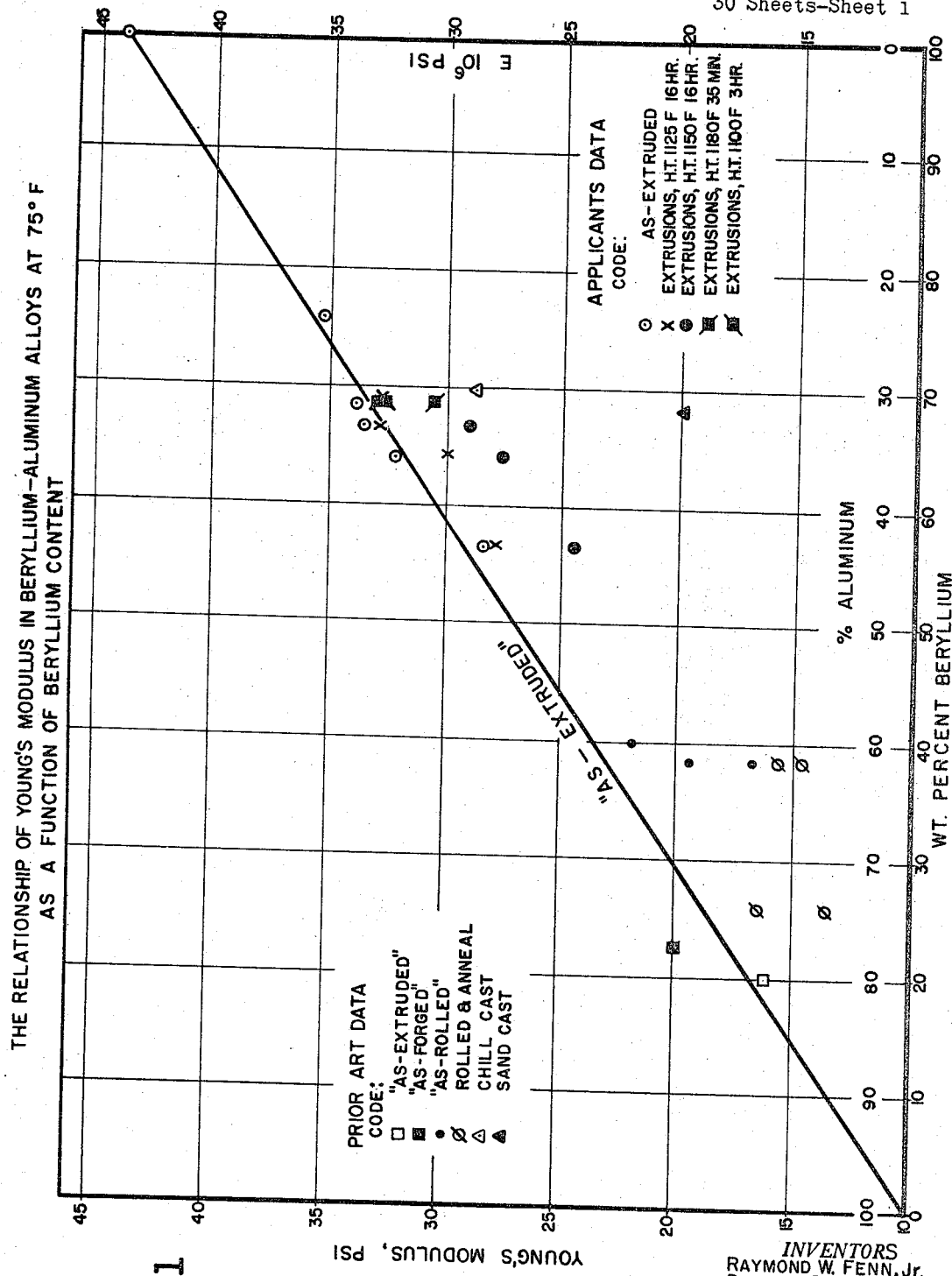

FIG_3
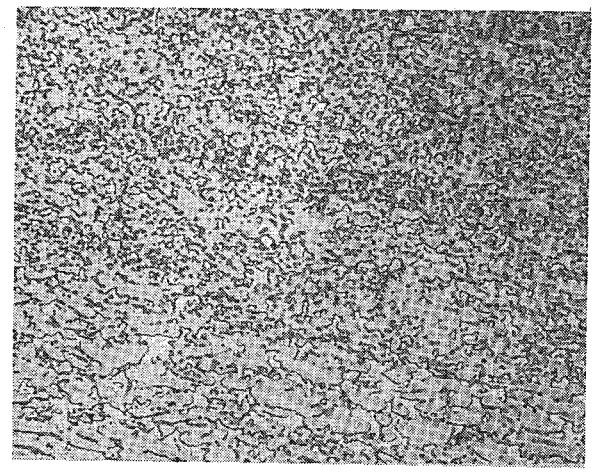
FIG_4
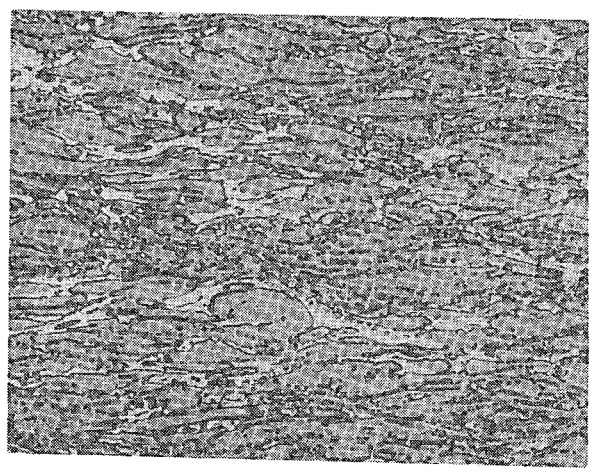

FIG_5
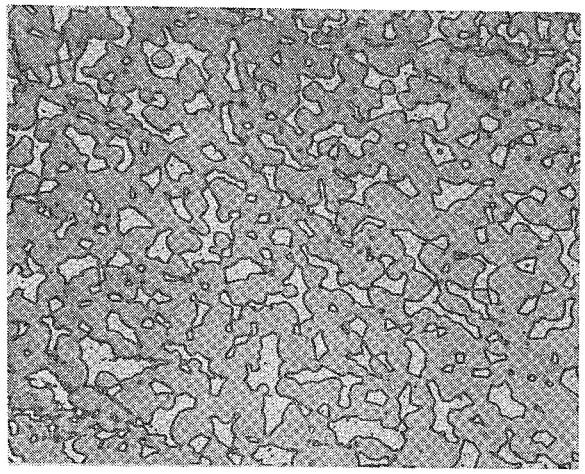
FIG_6
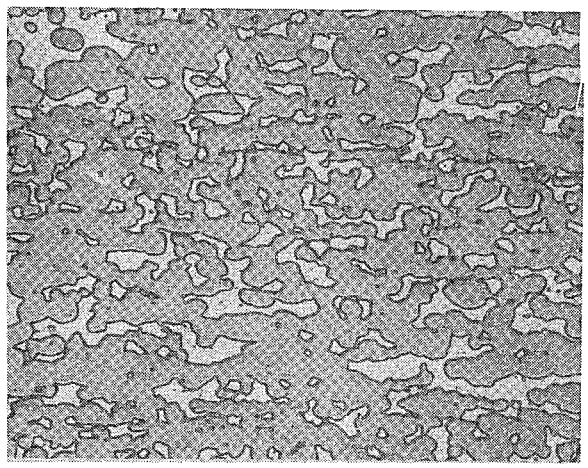

FIG_7A
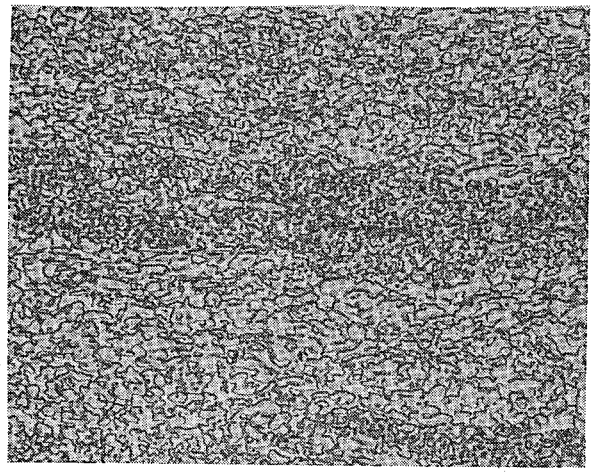
FIG_7B'
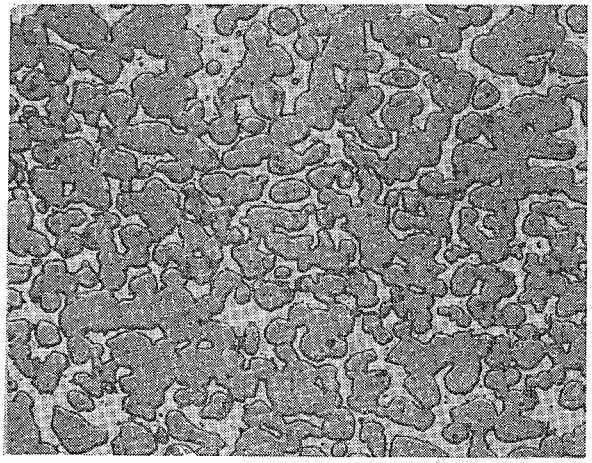

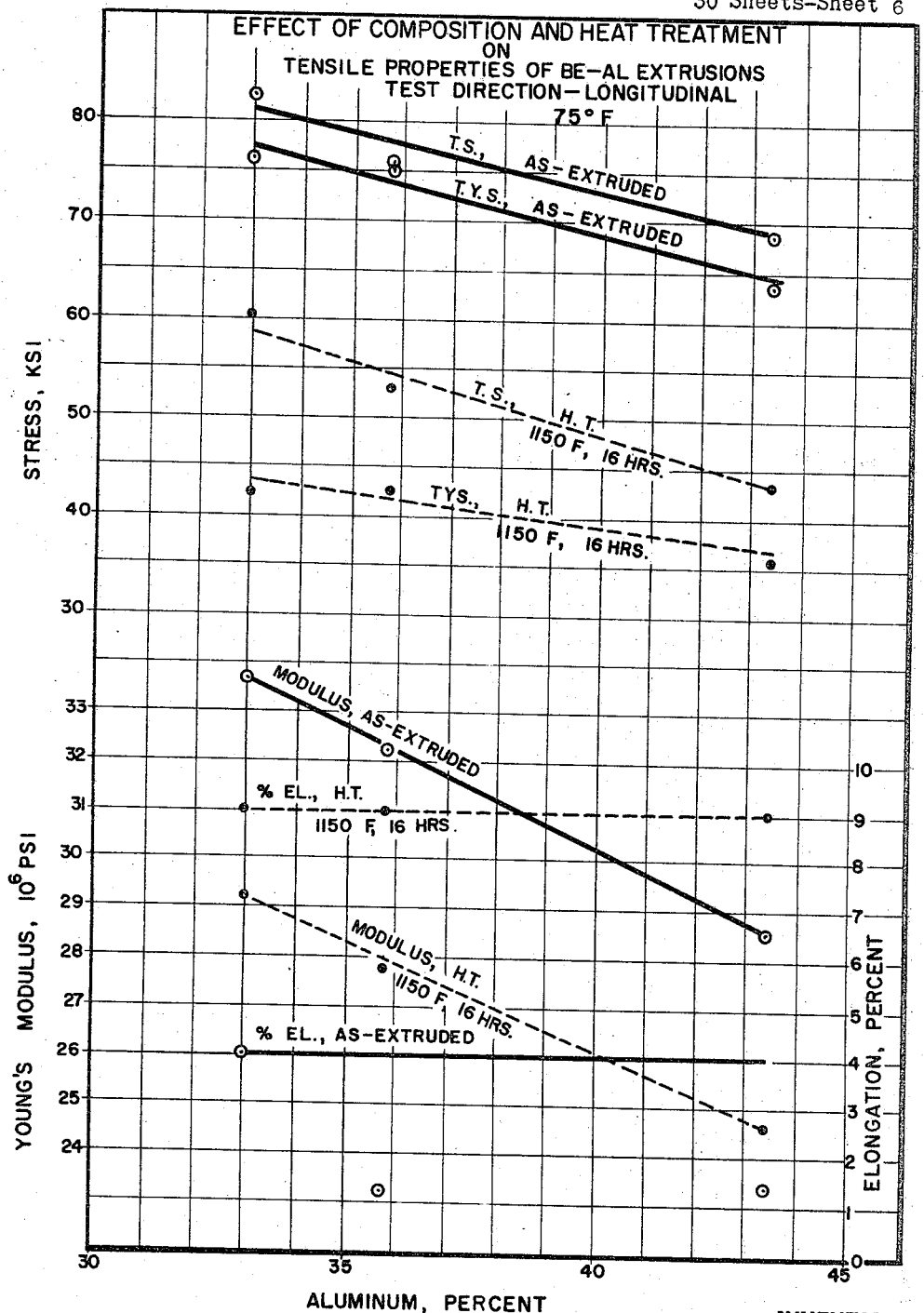
FIG_8

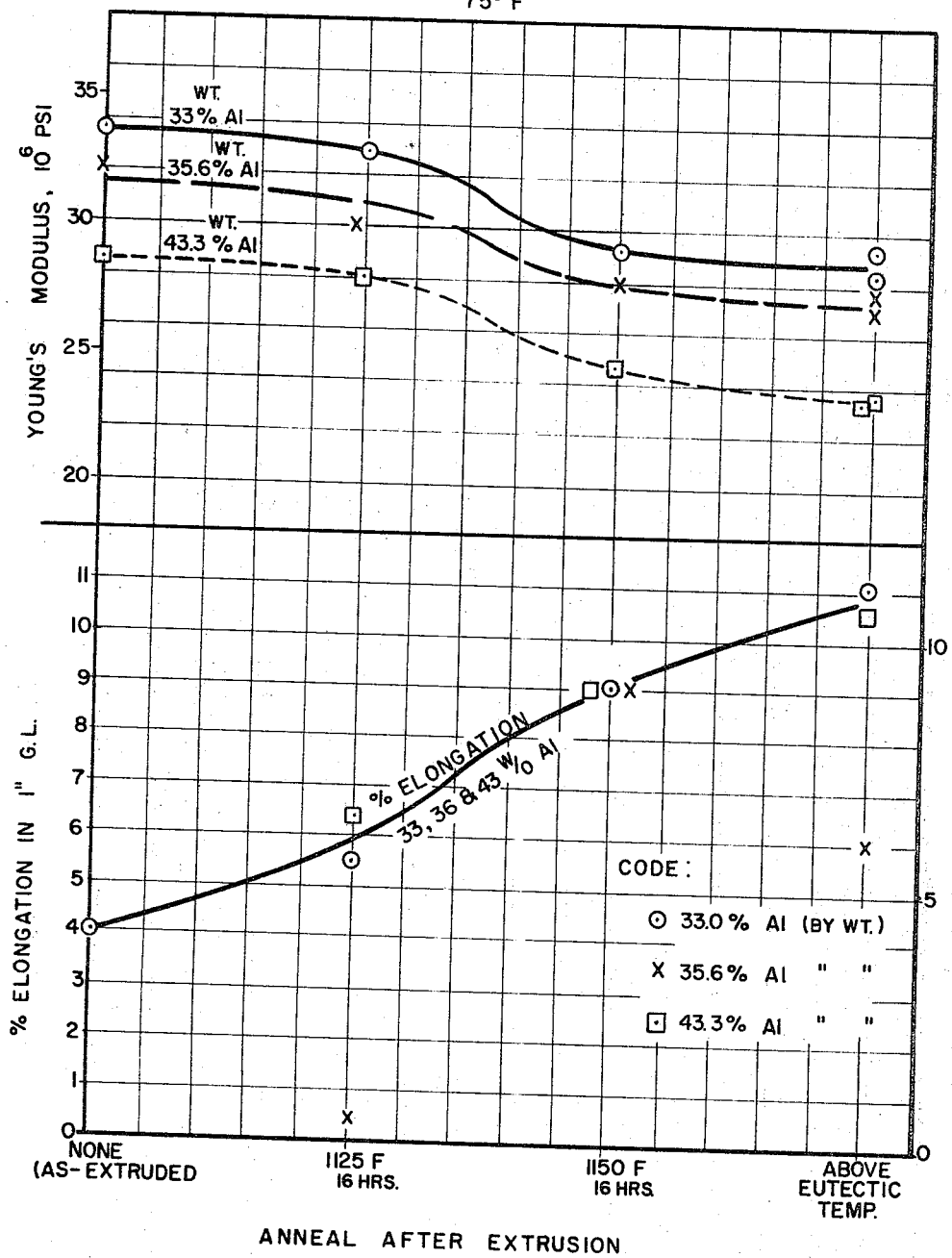
FIG_9

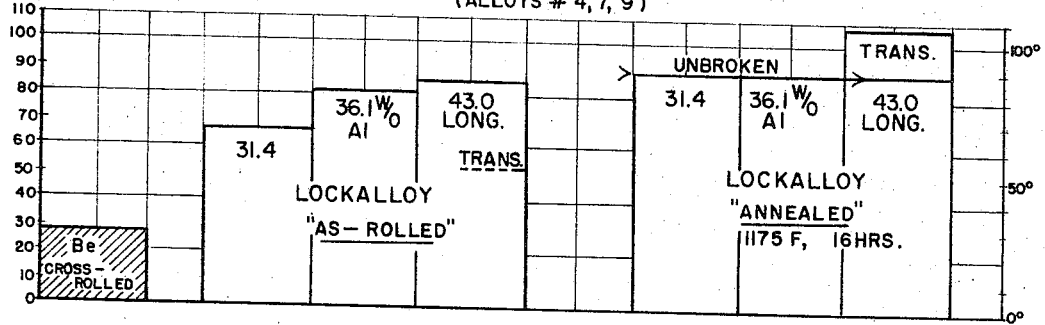
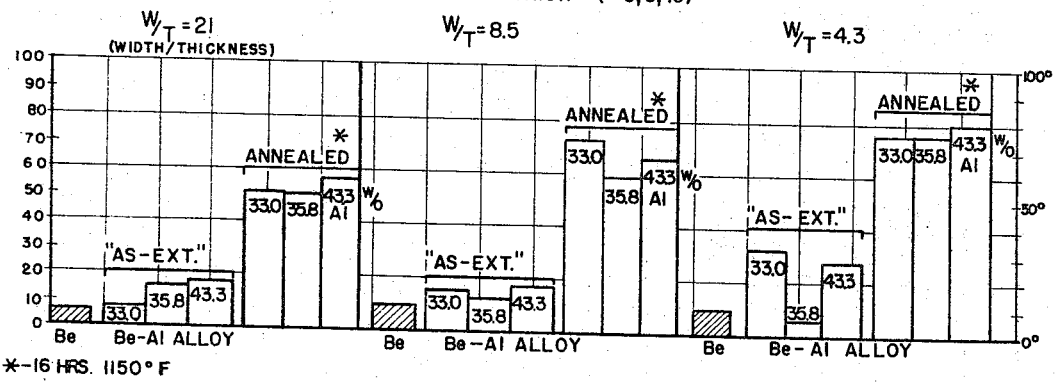
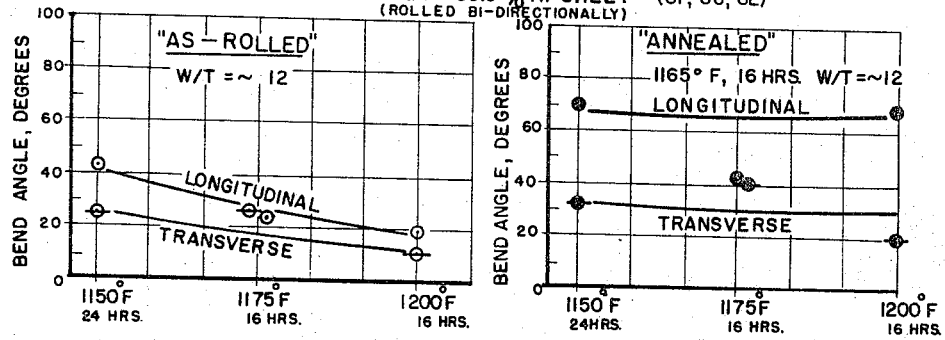
FIG_11

FIG_13

Be-35.8 W/O Al EXTRUDED ALLOY (X1000)
AS EXTRUDED PLUS 1180°F/16 HOURS

D, MEAN INTERCEPT PARTICLE DIAMETER
λ, MEAN FREE INTERPARTICLE DISTANCE
a, MEAN AREA OF ALUMINUM "ISLANDS"
$L_p$, MEAN PERIMETER LENGTH OF ALUMINUM "ISLANDS"
   (DARK PHASE IS BERYLLIUM RICH)

SCHEMATIC REPRESENTATION OF MICROSTRUCTURAL FEATURES

FIG_14

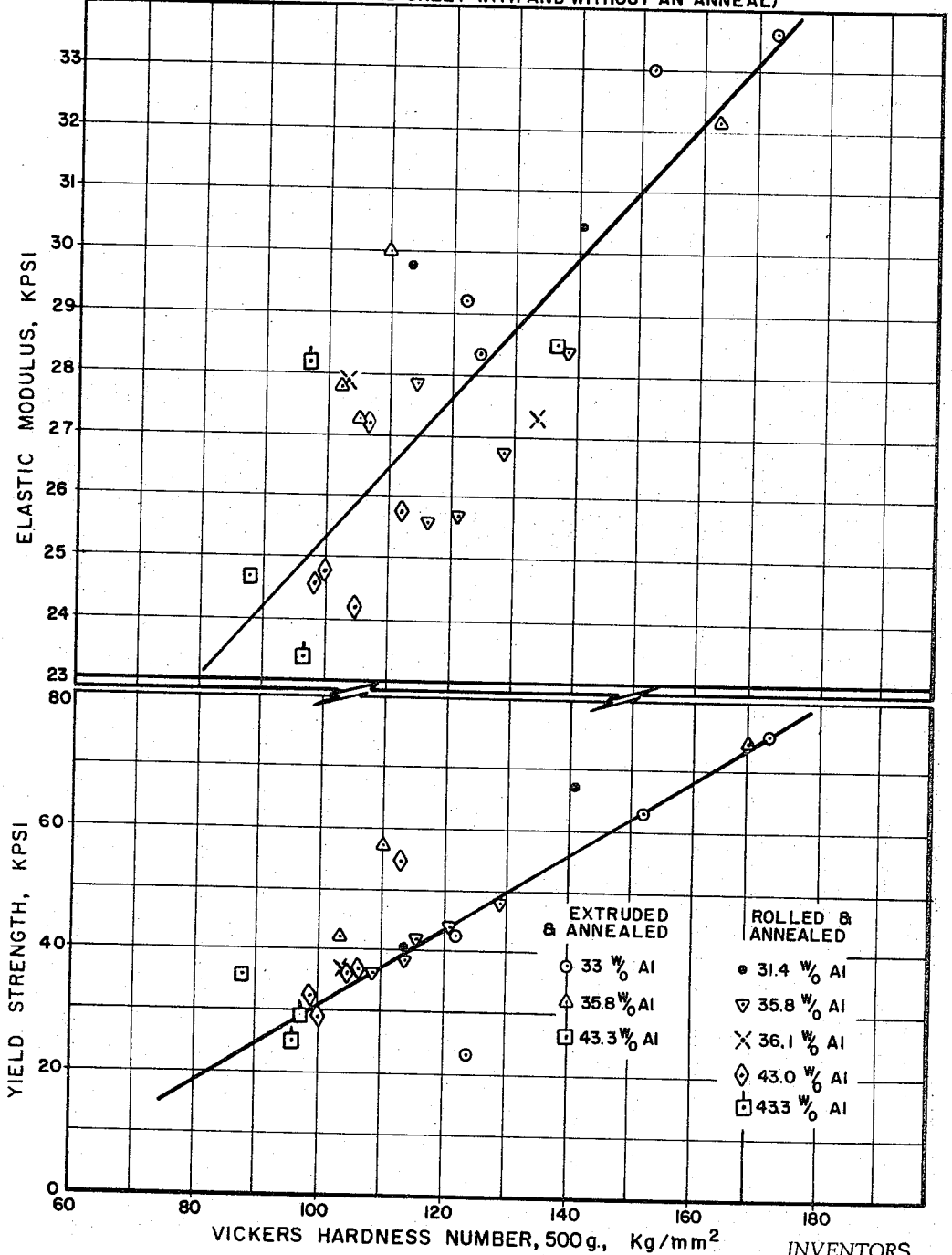
FIG_16

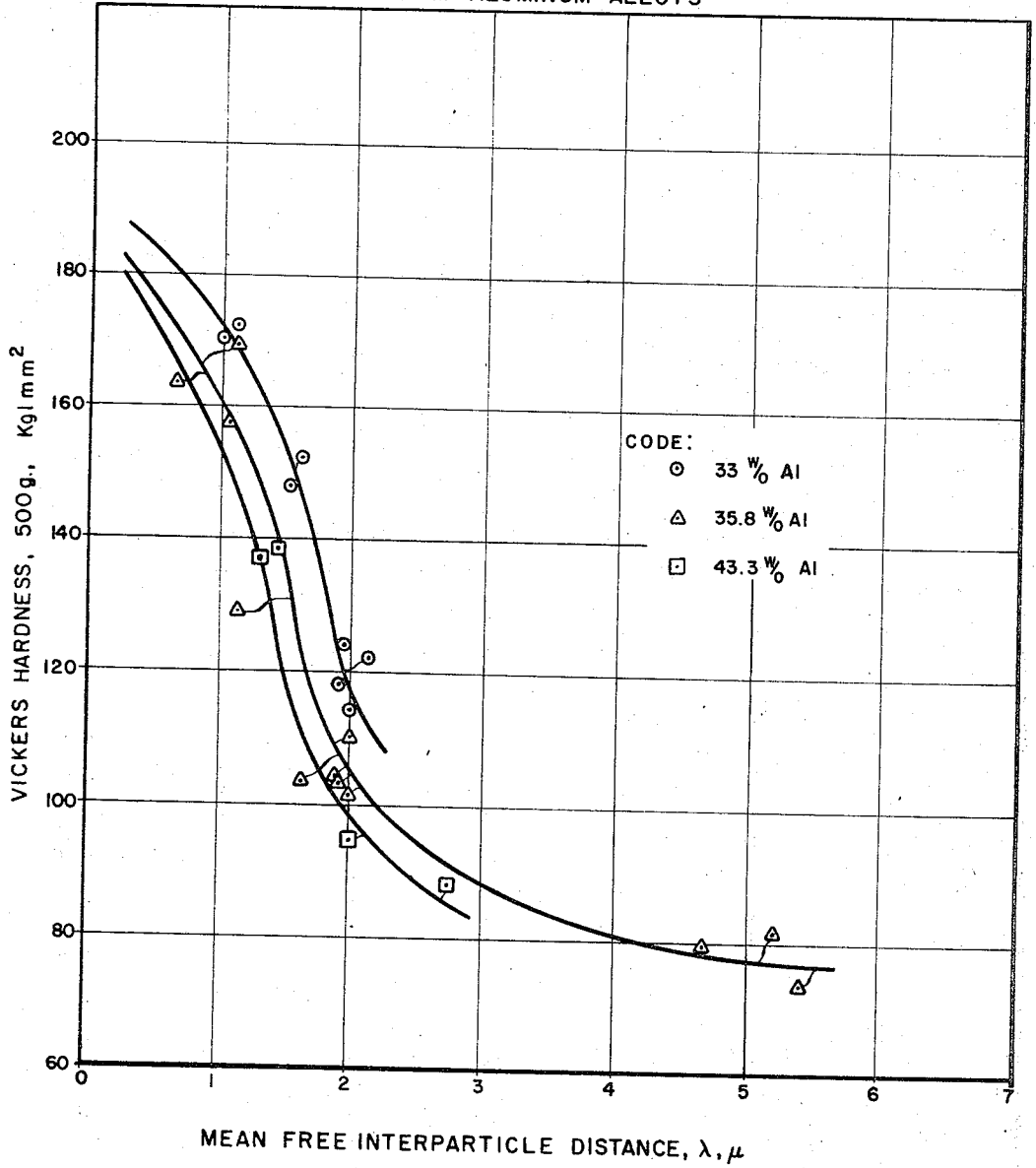

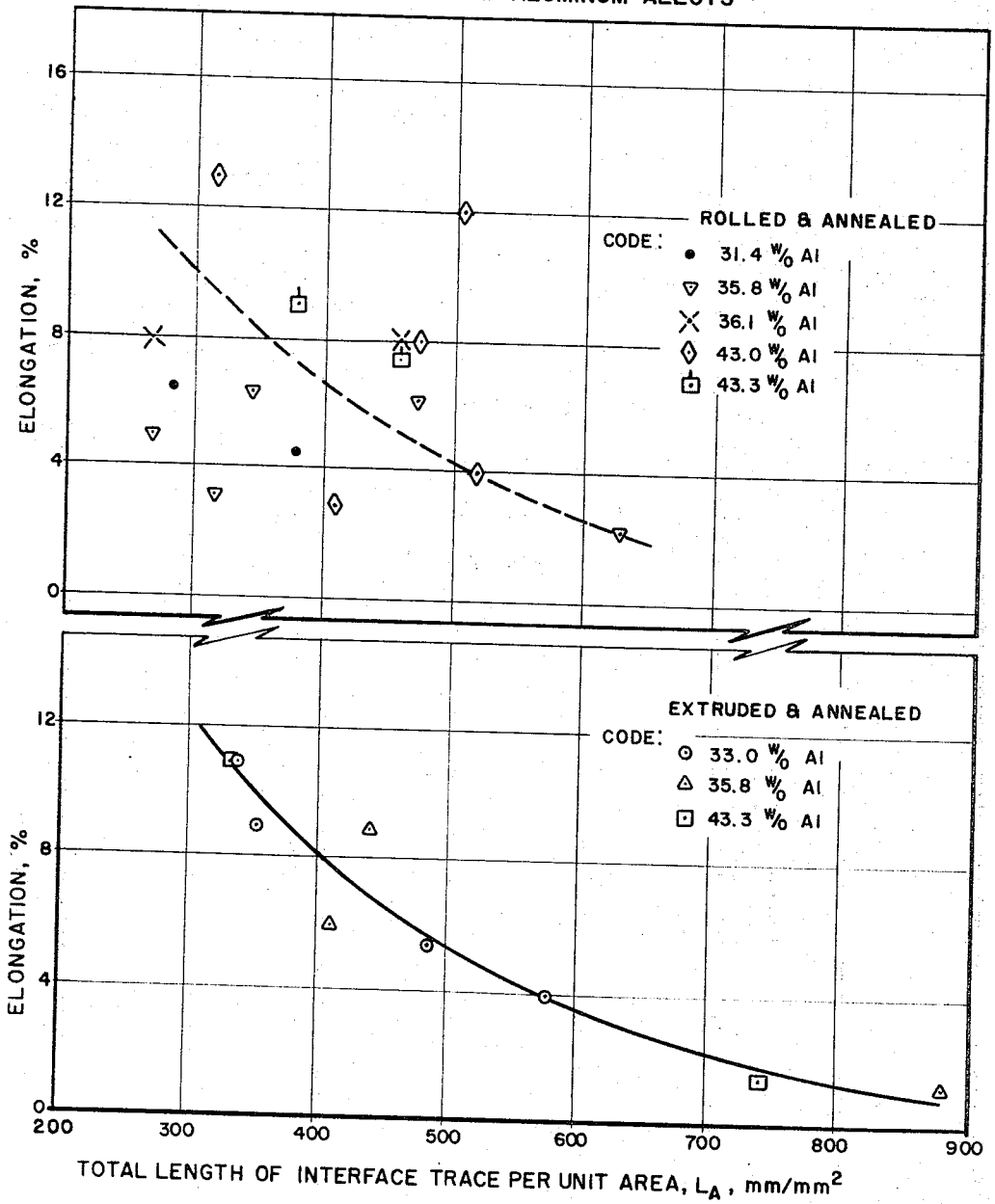
FIG_18

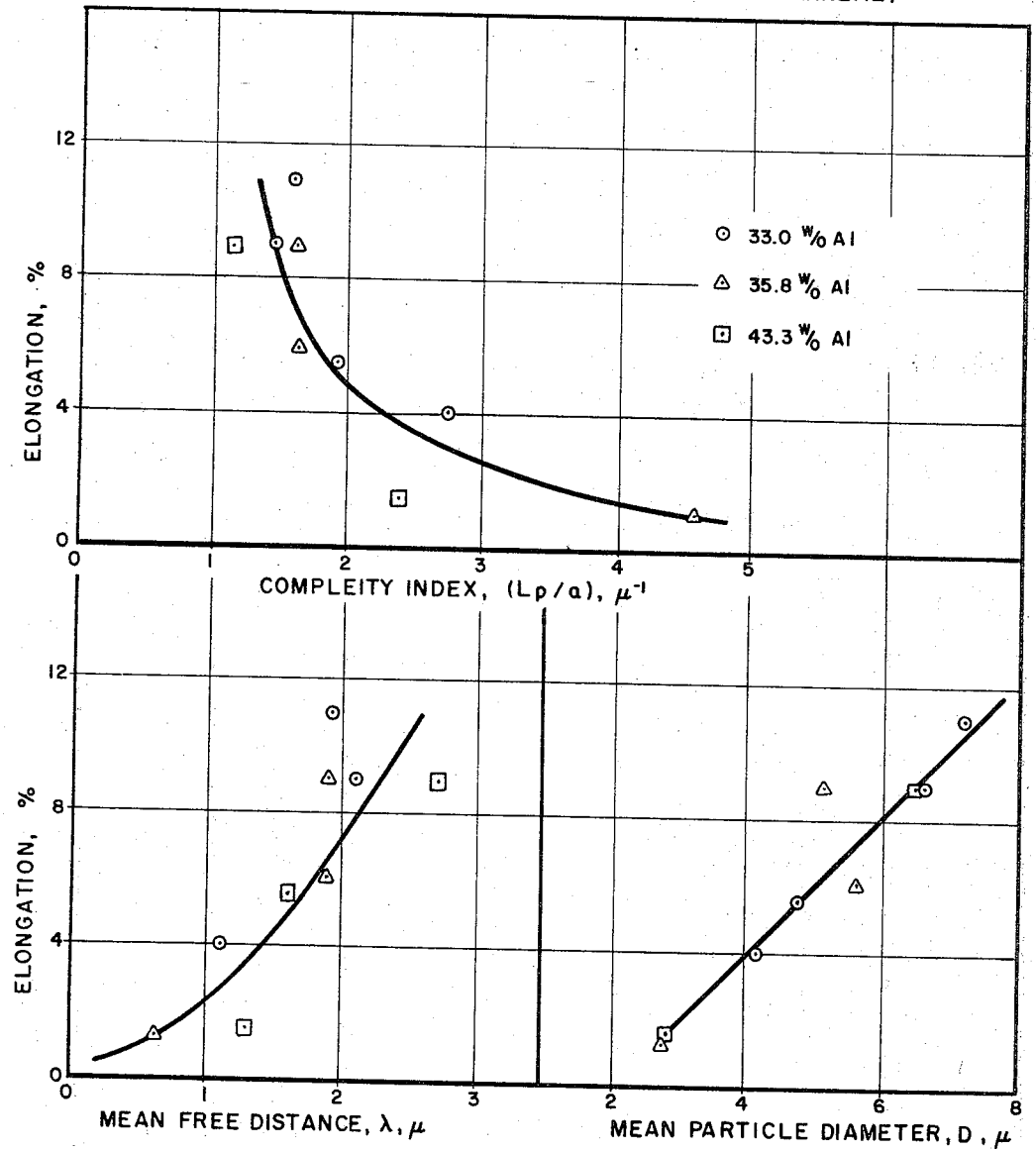
FIG_19

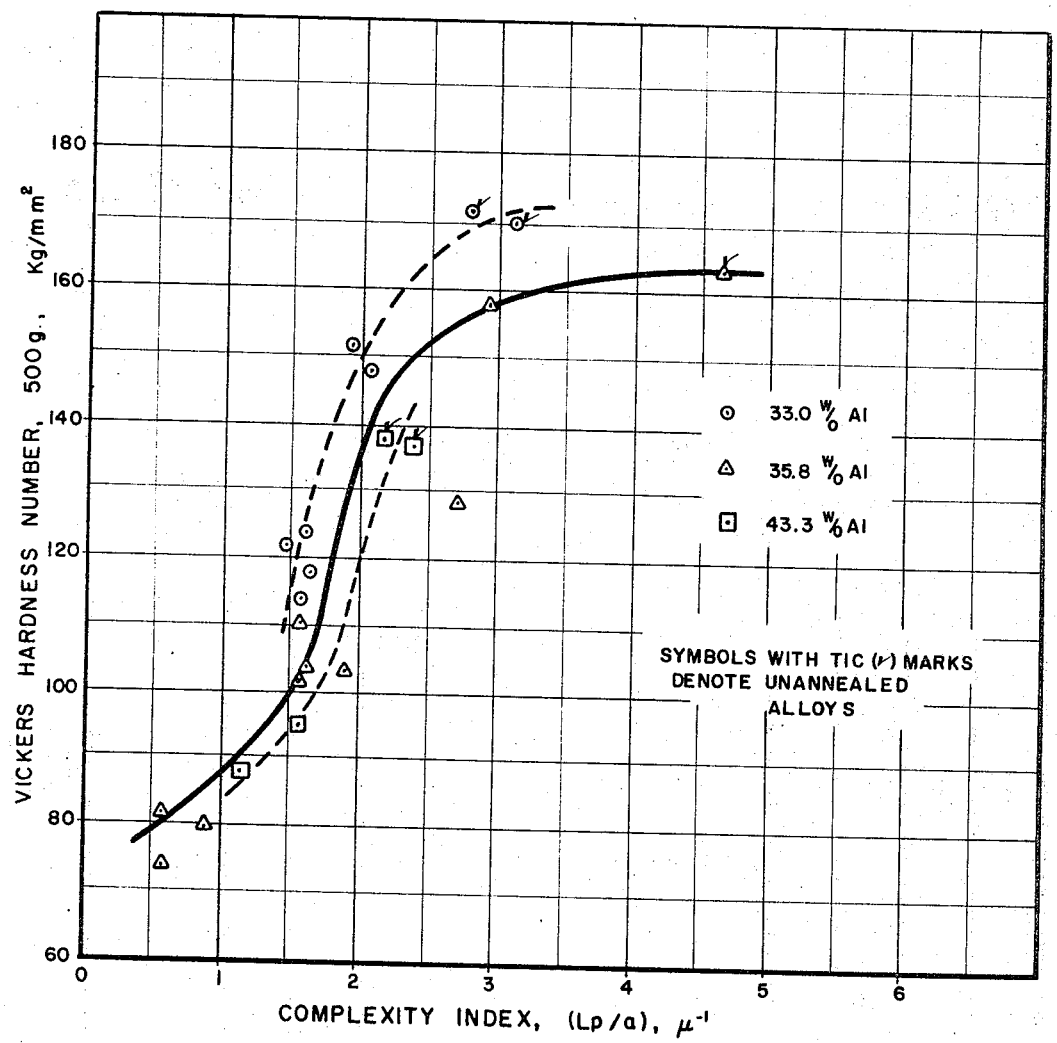

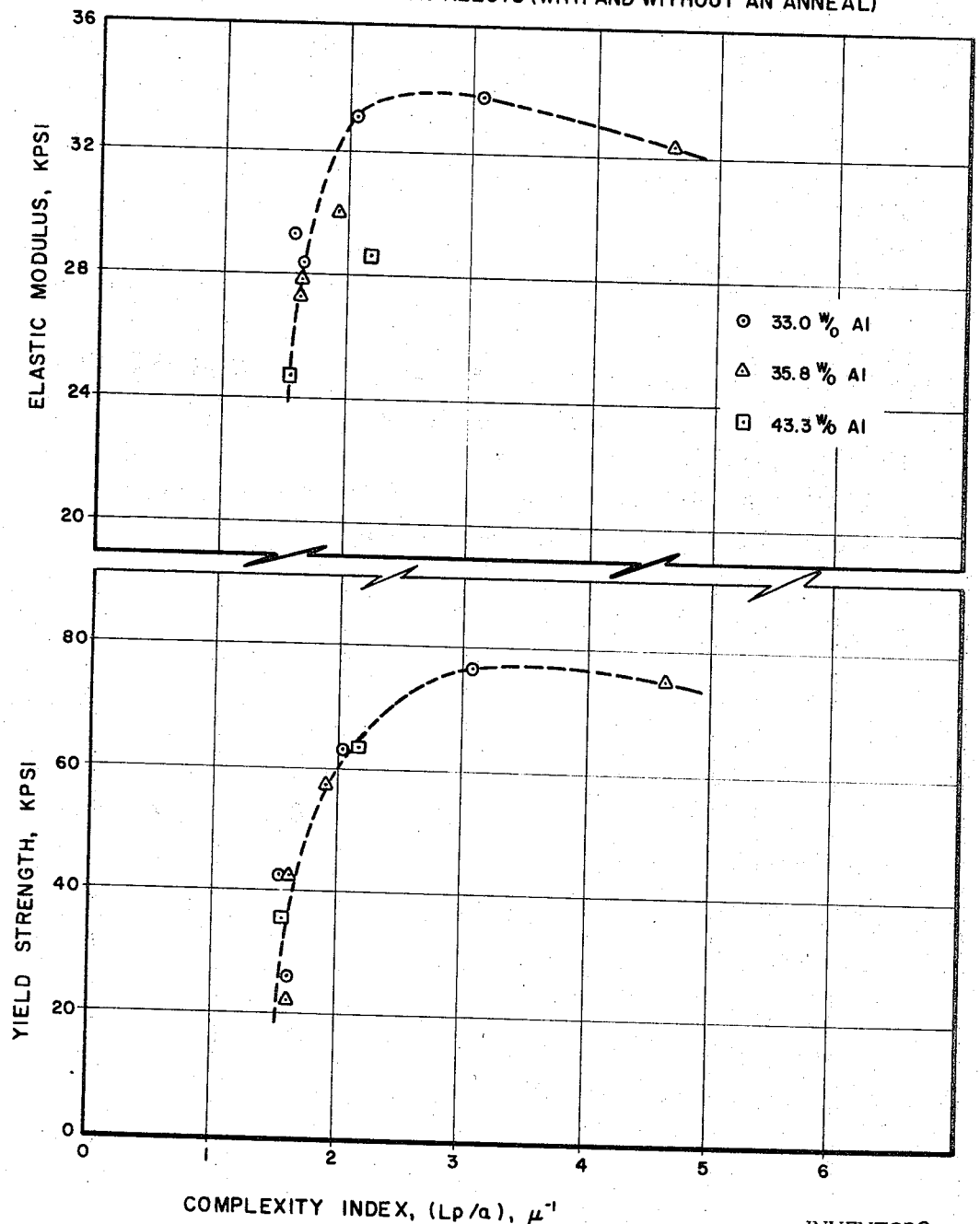
FIG_21

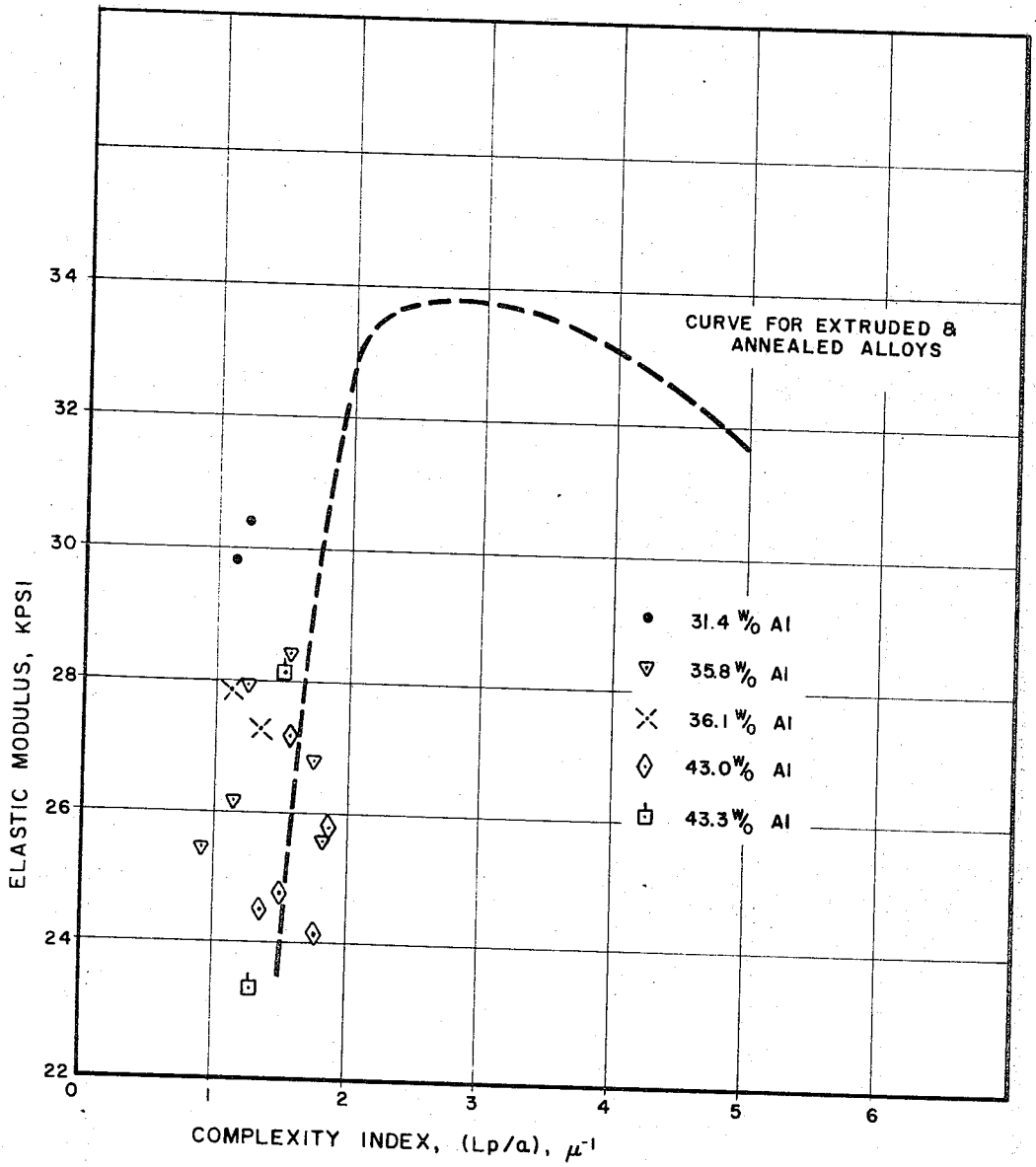
FIG_22

TABLE A1

DETAILED BEND DATA FOR Be-Al EXTRUSIONS COMPARED TO CROSS-ROLLED Be SHEET

| ALLOY W/o Al | NOMINAL WIDTH (IN.) | "AS—EXTRUDED" ||||| ANNEALED, 1150°F, 16 HRS. |||||
|---|---|---|---|---|---|---|---|---|---|---|---|
| | | ALLOY AND SPEC. # | THICK. (IN.) | WIDTH/ THICKNESS | MAXIMUM LOAD (LBS.) | DEFLECT. AT FAILURE IN. (b) | BEND ANGLE AT FAILURE (DEGS.) | ALLOY & SPEC. | THICK. (IN.) | WIDTH/ THICKNESS | MAXIMUM LOAD (LBS.) | DEFLECT. AT FAILURE IN. (c) | BEND ANGLE AT FAILURE (DEGS.) |

| ALLOY W/o Al | NOMINAL WIDTH (IN.) | ALLOY AND SPEC.# | THICK. (IN.) | WIDTH/ THICKNESS | MAXIMUM LOAD (LBS.) | DEFLECT. AT FAILURE IN. (b) | BEND ANGLE AT FAILURE (DEGS.) | ALLOY & SPEC. | THICK. (IN.) | WIDTH/ THICKNESS | MAXIMUM LOAD (LBS.) | DEFLECT. AT FAILURE IN. (c) | BEND ANGLE AT FAILURE (DEGS.) |
|---|---|---|---|---|---|---|---|---|---|---|---|---|---|
| NONE (a) | 1.25 | | | | | | | 1-1 1-2 | .0590 .0605 | 22.2 20.5 | 102 104 | .051 .048 | 9 6 |
| 33.0 | " | 5-3-2 | .0567 | 20.9 | 218 | .064 | 8 | 5-3-1 | .0581 | 22.2 | 175 | <.325 | 51 |
| 35.8 | " | 8-3-2 | .0598 | 20.9 | 232 | .097 | 15 | 8-3-1 | .0603 | 20.7 | 168 | .300 | 50 |
| 43.3 | " | 10-2-2 | .0589 | 21.2 | 194 | .104 | 17 | 10-2-1 | .0593 | 21.1 | 140 | .345 | 56 |
| NONE (d) | .50 | 209(d) | .0571 | 8.9 | 38.5 | .072 | 11 | | | | | | |
| NONE (a) NONE (a) | " | | | | | | | 1-3 1-4 | .0578 .0588 | 8.5 8.5 | 37.5 38.5 | .058 .063 | 11 12 |
| 33.0 | " | 5-3-4 | .0576 | 8.7 | 85 | .097 | 14 | 5-3-3 | .0570 | 8.7 | 64.5 | .465 | 73 |
| 35.8 | " | 8-3-4 | .0568 | 8.8 | 76 | .091 | 12 | 8-3-3 | .0559 | 9.0 | 52 | .370 | 59 |
| 43 | " | 10-2-4 | .0579 | 8.7 | 67 | .130 | 17 | 10-2-3 | .0584 | 8.5 | 50 | .406 | 65 |
| NONE (a) | .25 | | | | | | | 1-5 1-6 | .0602 .0603 | 4.1 4.1 | 21 21 | .074 .072 | 14 12 |
| 33.0 | " | 5-3-6 | .0574 | 4.3 | 44 | .192 | 33 | 5-3-5 | .0582 | 4.3 | 32.5 | .480 | 76 |
| 35.8 | " | 8-3-6 | .0583 | 4.3 | 34.5 | .046 | 5 | 8-3-5 | .0574 | 4.3 | 27 | >.500 | 76 |
| 43.3 | " | 10-2-6 | .0581 | 4.3 | 35 | .172 | 27 | 10-2-5 | .0584 | 4.2 | 24 | .525 | 81 |

(a) CROSS-ROLLED Be, PICKLED .004"/FACE, & ANNEALED 4 HRS. 850 C (1562°F)
(b) AUTOGRAPHICALLY RECORDED
(c) MEASURED AFTER FAILURE
(d) UNHEAT-TREATED, CROSS-ROLLED Be, SHEET

FIG.23

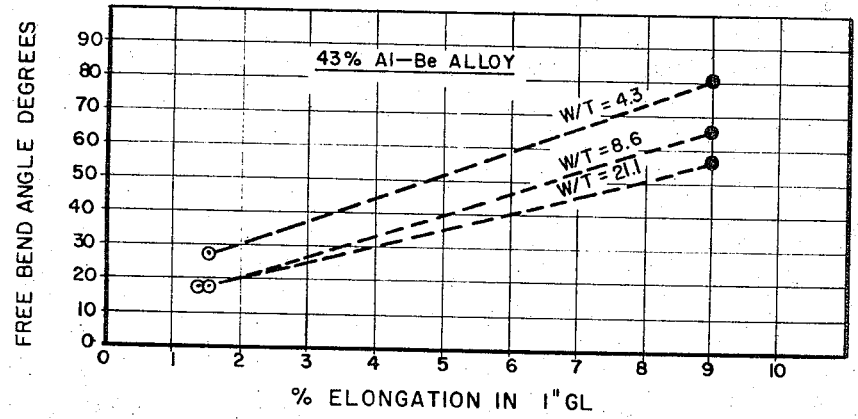
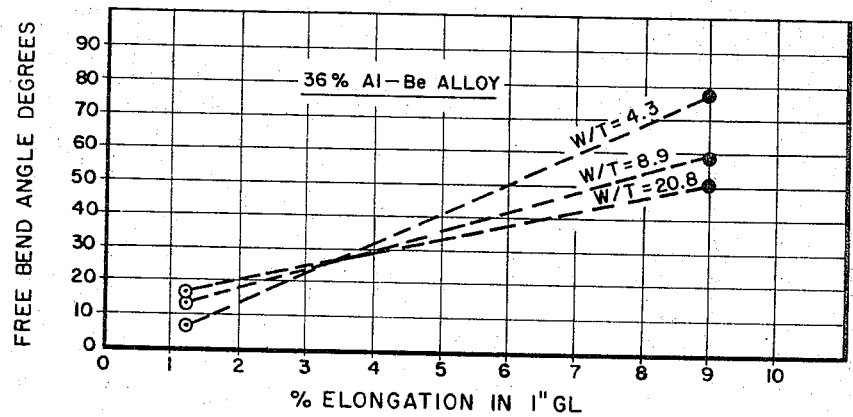
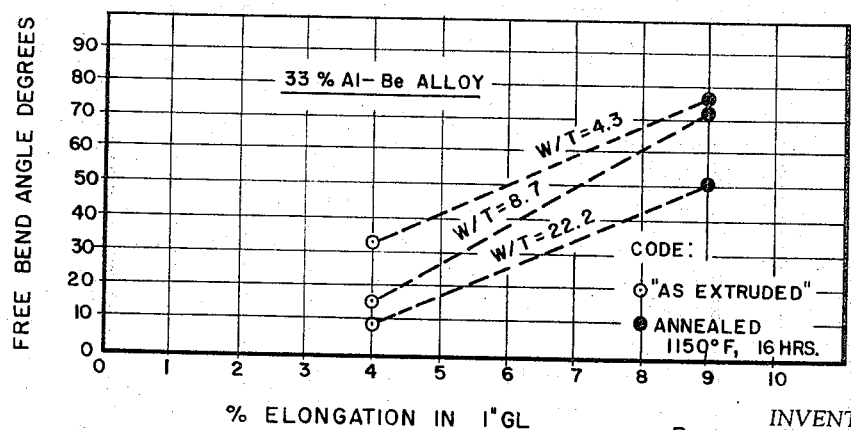
FIG_24

FIG._27

FIG_29

3,337,334
BERYLLIUM-ALUMINUM ALLOY
Raymond W. Fenn, Jr., Los Altos Hills, Morris A. Steinberg, Hillsborough, Donald D. Crooks, San Jose, Ervin E. Underwood, Palo Alto, Claus G. Goetzel, Portola Valley, and Henry W. Lavendel, Palo Alto, Calif., assignors to Lockheed Aircraft Corporation, Burbank, Calif.
Filed Dec. 6, 1963, Ser. No. 328,558
18 Claims. (Cl. 75—150)

This invention relates generally to the field of metallurgy and is specifically concerned with the description of new beryllium/aluminum based alloys showing substantially improved properties of strength, ductility, and machinability over prior art materials.

Commensurate with the increased interest and development in missiles and space technology, the last few years have seen increasing emphasis placed upon the problem of reducing the weight of structural members of vehicles which must withstand considerable stress and strain. A natural candidate for utilization in such instances is the metal beryllium. Beryllium's low density of 1.848 gms. per cc. and high modulus of elasticity of $44 \times 10^6$ p.s.i. makes it one of the best candidate materials for structural application in space vehicles where compression buckling or crippling is likely to be encountered. This material, having a Young's modulus approximately 1½ times that of steel, is a most desirable material for stiffened airframe members that are designed for structural stability, but which require good fabricability and low weight.

Unfortunately, pure beryllium suffers from inherent brittleness in the states of stress induced by normal fabricating processes such as bending and the like. In practice, riveted joints in beryllium structures may have strengths as low as only about 20% of that which would be expected, probably because of the low short-transverse ductility of beryllium. This is due to beryllium's sensitivity to surface damage from mechanical working and to its propensity for surface cracking and brittleness.

According to the best present understanding of the problem, lack of three-dimensional ductility in polycrystalline beryllium at low temperatures (for example below 600° F.) may be ascribed to several factors, all of which may be contributing. These are:

(1) The restricted number of modes of deformation,
(2) The absence of slip modes resolvable along the c-axis of the crystal lattice unit cell,
(3) The fact that the basal plane is the predominant slip plane but also the plane of easy cleavage,
(4) The ease with which bend planes form during basal slip, and the inability of these bend planes to be moved by an applied stress so that further strain promotes the splitting of basal planes, and
(5) The condition of purity of the metal.

Beryllium sheet and extruded stock as presently produced show high strength, high modulus of elasticity, and relatively low ductility. These highly desirable strength properties are the result of preferred orientation of the crystal lattice that develops during the production process, yet they are accompanied by other adverse characteristics that severely limit general usefulness for flight vehicle structural components. It thus appears that the high strength of beryllium cannot be utilized in most instances because of its associated brittleness with accompanying low ductility as evaluated by bend tests. (When a wide sheet of beryllium is bent, as in the operation of forming a flange on a sheet, brittle fracture generally results.)

This lack of three-dimensional ductility of beryllium is so serious a handicap that fabrication is greatly impeded, reliability of components jeopardized, and economic manufacture of useful parts of the metal often made impossible.

Various attempts have been made in the past to remedy the brittleness factor in order to utilize the great potential of this metal. Unfortunately, since the lack of ductility is substantially a basic property connected with the specific atomic spacings in the metal's hexagonal close packed space lattice cell, strongly directional mechanical properties are unavoidable when standard metal working and fabrication techniques are used, even with the purest metal. Such innovations as upsetting prior to or during extrusion or cross-rolling have resulted in only marginal improvement of the ductility and deformation capacity.

Attempts to improve the ductility of beryllium through alloying with a ductile metal have so far met with little success. For example, copper has been alloyed with beryllium and has resulted in intermetallic compound formation. The addition of magnesium as an alloying constituent encountered a difficulty of loss of the magnesium through evaporation. Alloying with silver was found to be more promising, since minor improvements in ductility could be observed on extrusions made from such alloys. However, silver because of its high specific gravity, when added in amounts sufficient to cause improvement, also caused appreciable increase in density without commensurate gain in rigidity.

In 1938 a report indicated that the then available alloys were still too brittle to satisfy the search for a better piston alloy. This early work was done exclusively by using the then-known melting and casting technique, which resulted in coarse dendritic eutectic structures. Investigators were not primarily concerned with the alloys for structural purposes, hence no extensive determinations of Young's modulus were, to applicants' knowledge, made. (The only figure of which applicants are aware is a measurement of $20.4 \times 10^6$ p.s.i.) Another investigator found that wrought binary cast aluminum-rich alloys had a definite ductility, but were inferior to those of strong aluminum-base alloys then used in aircraft. Alloys containing approximately 70% and 67.5% by weight of beryllium had been prepared by sand casting and chill casting. Yield strength, tensile strength and particularly elongation were considerably below those acceptable for an engineering material to be used in structural elements.

In order to overcome the difficulty encountered in working these alloys, a powder metallurgy approach has been attempted by several investigators. It was hoped that by surrounding beryllium powder particles with a continuous, ductile phase of aluminum, a two phase alloy of sufficient ductility would result which would enable extrusion or rolling into a wrought structure. Extrusions of such alloy compositions containing 60% and 75% by weight of beryllium were found defective or impossible to produce, and although several investigators have attempted to develop commercially useful beryllium-aluminum alloys, none of these alloys have achieved commercial importance.

Applicants, recognizing the advantages to be realized if aluminum could be successfully utilized as an alloying metal with beryllium, have as a result of an extensive research and development program, developed a series of new alloys, called "Lockalloys," which have markedly superior moduli of elasticity with significantly improved ductility while maintaining density in a desirable range. (This feature of high modulus is illustrated in FIGURE 1.) Density and modulus of elasticity are particularly important parameters in the design of lightweight structures, since they control the weight of the structure required to resist crippling and buckling under compressive loading. It is noted that the ability, which applicants have developed, to *change* or *control* modulus of elasticity as measured at room temperature is quite unusual and not to be expected. Further, Lockalloys with impact strength of 68 inch pounds have been produced, whereas commercially pure Be in the same test has an impact strength of only 9 inch pounds.

It is the primary object of this invention to provide beryllium-aluminum based alloys which have improved ductility as compared to beryllium while retaining an elastic modulus to density ratio as close as possible to that of beryllium, thereby providing new and useful structural materials for engineering requirements involving a high rigidity to weight ratio.

Another object of this invention is to provide beryllium-aluminum based alloys in which the modulus of elasticity may be controlled and changed to produce alloys having heretofore unrealizable combinations of density, ductility and modulus.

Another object of the invention is to produce beryllium-aluminum based alloys having as many of the attributes of beryllium as possible, but which minimize the faults found in beryllium and prior art beryllium-aluminum alloys such as susceptibility to cracking, lack of ductility, poor malleability, low strength and extreme brittleness.

It is a further object of the invention to provide beryllium-aluminum based alloys in which, through proper interpretation of the phase relations in the beryllium-aluminum system and consequent application of a proper sequence of operational steps, a microstructure is produced which permits easy fabrication of sheet, strip, bars, rod, and other suitable wrought structural members; such alloys having a Young's modulus in excess of that obtainable with prior art alloys, a density of less than 2.3 gms. per cc., and an elongation of more than approximately 3%.

It is a further object of this invention to produce beryllium-aluminum based alloys which have a controlled microstructure which is composed of a ductile aluminum-rich phase which substantially completely surrounds the beryllium-rich phase and renders the composite plastically deformable under states of stress under which the beryllium metal alone could not plastically deform.

Yet another object of this invention is to provide processes for producing beryllium-aluminum based alloys incorporating the attributes and qualities mentioned above, which are at the same time within the range of economic praticality.

These, and other objects which will undoubtedly appear to the trained metallurgist, are realized in accordance with the teachings of our invention as set forth hereinbelow. In accordance with this specification, the following figures, (including photomicrographs) are set forth in order to graphically explain the intricacies of the invention:

FIGURE 1 (graph) "The Relationship of Young's Modulus in Beryllium-Aluminum Alloys at 75° F. as a Function of Beryllium Content."

FIGURE 2 is a photomicrograph, 1000 magnification, of a typical Be-Al alloy (flake "powder") starting material used in the manufacture of Lockalloy Be-Al alloys (24.3 wt. percent Al).

FIGURE 3 is a photomicrograph on a *transverse* section (1000 mag.) of a typical 33.0 wt. percent Al Be-Al alloy which has been extruded (as-extruded condition) from a starting material such as shown in FIGURE 2. (C.I.=$1.98\mu^{-1}$) (Lambda=$1.59\mu$, D=$1.59\mu$).

FIGURE 4 is a photomicrograph on a *longitudinal* section (1000 mag.) of a 33.0 wt. percent Al Be-Al alloy which has been extruded (as-extruded condition) in accordance with the present invention. (C.I.=$1.56\mu^{-1}$, Lambda=$2.02\mu$, D=$2.24\mu$).

FIGURE 5 is a photomicrograph on a *transverse* section (1000 mag.) of a 33.0 wt. percent Al Be-Al alloy extrusion alloy which has been heat treated for 16 hrs. at 1150° F. (C.I.=$1.34\mu^{-1}$, Lambda=$2.35\mu$, D=$5.98\mu$).

FIGURE 6 is a photomicrograph on a *longitudinal* section (1000 mag.) of a 33.0 wt. percent Al Be-Al alloy extrusion which has been heat treated for 16 hrs. at 1150° F. (C.I.=$1.06\mu^{-1}$, Lambda=$2.95\mu$, D=$5.39\mu$).

FIGURE 7(A) is a photomicrograph on a *transverse* section (1000 mag.) of a typical Be-Al alloy (43.3 wt. percent Al) shown "as extruded" (C.I.=$1.73\mu^{-1}$, $\lambda$=1.82, D=1.35) and, FIGURE 7(B) after heat treatment, in this case at 1150° F. for 16 hours, (C.I.=1.02, $\lambda$=2.92, D=6.25).

FIGURE 8 (graph) "Effect of Composition and Heat Treatment on Tensile Properties of Be-Al Extrusions" (test direction, longitudinal at 75° F.).

FIGURE 9 (graph) "Effect of Annealing on Young's Modulus and Percent Elongation of Be-Al Extrusions" (longitudinal direction at 75° F.).

Figure 10:
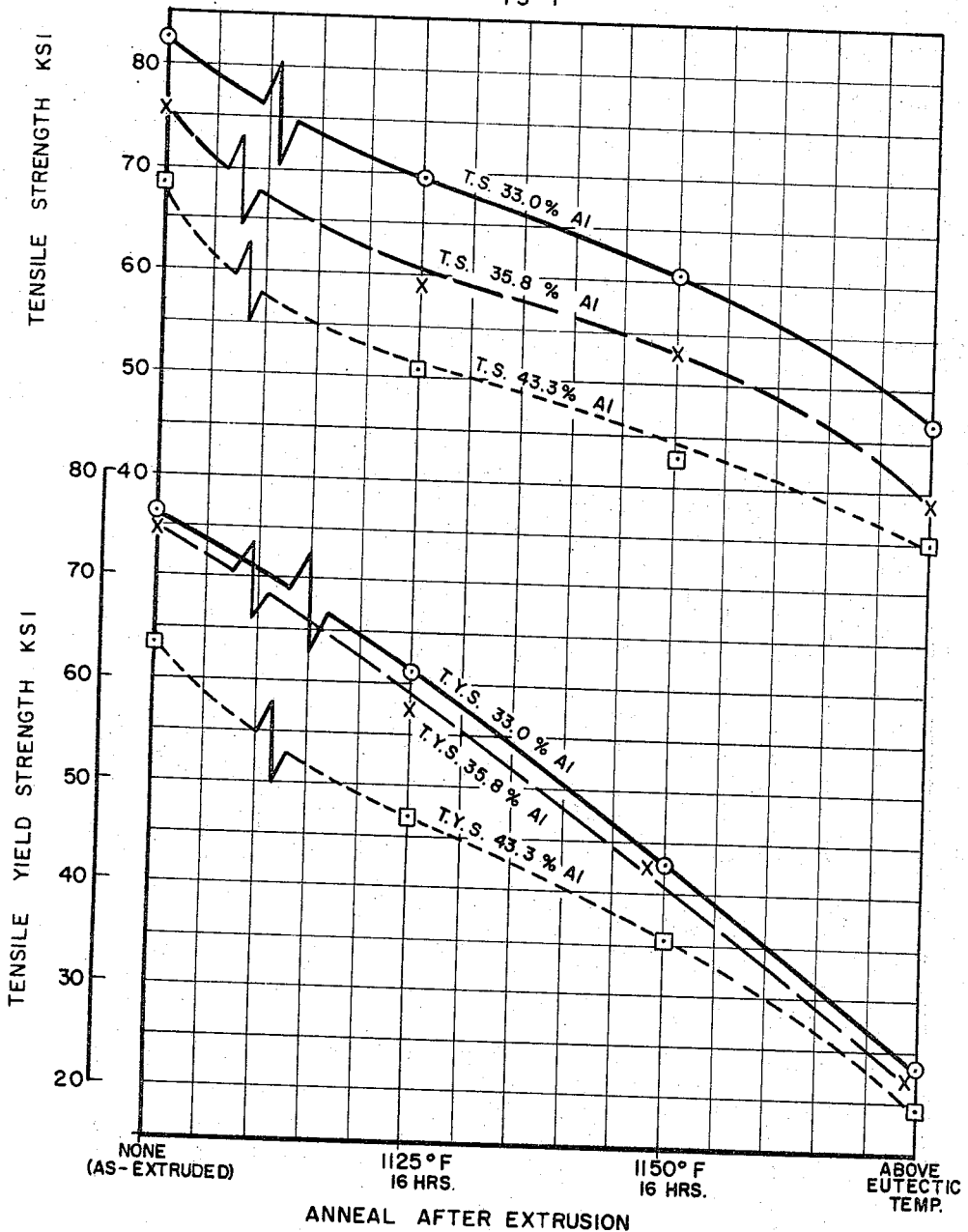

FIGURE 10 (graph) "Tensile Strength and Tensile Yield Strength of Be-Al Extrusions vs. Annealing Temperature" (longitudinal direction at 75° F.).

FIGURE 11 (graph) "Summary of Bend Data for Be-Al Alloys."

Figure 12:
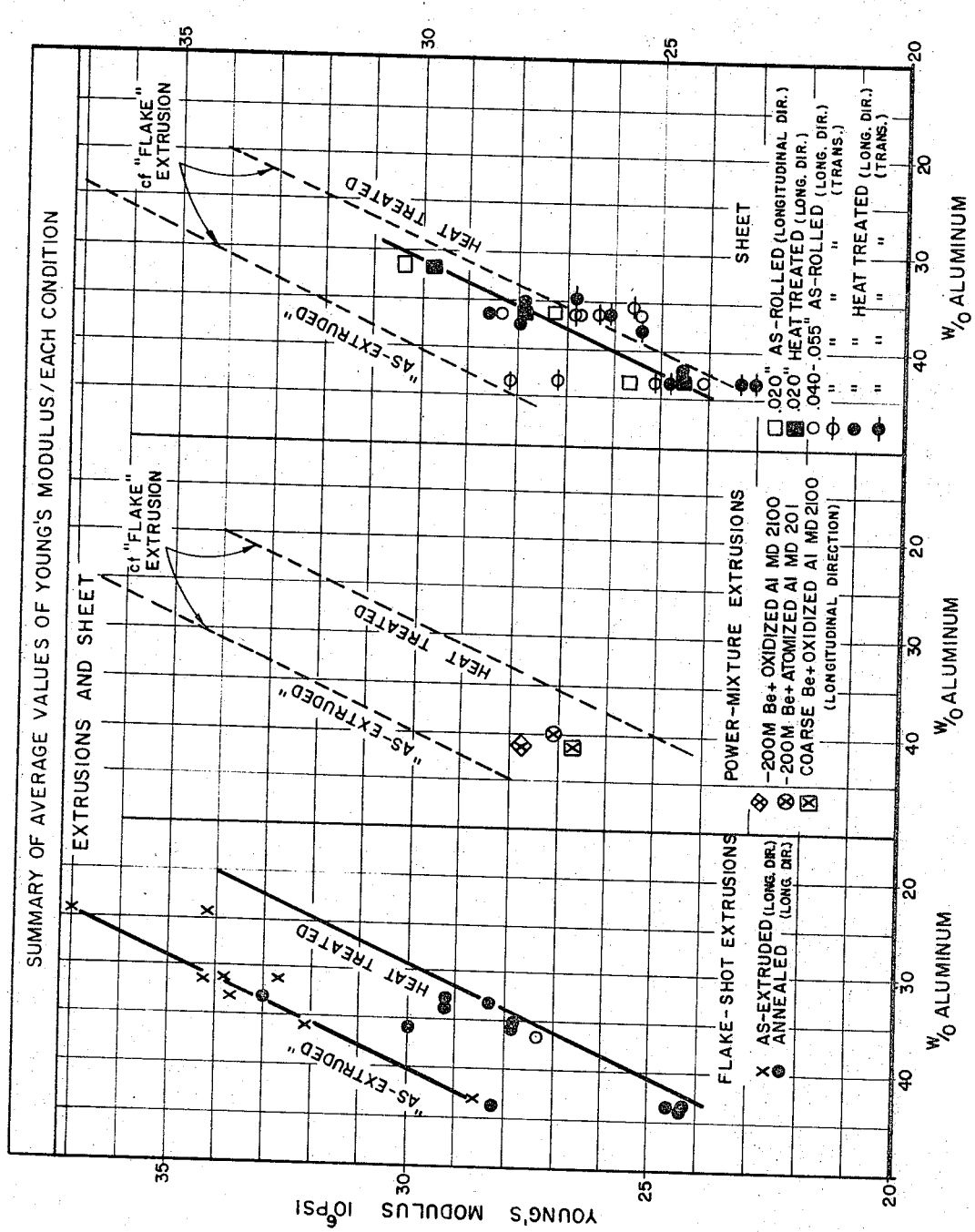

FIGURE 12 (graph) "Summary of Average Values of Young's Modulus/Each Condition-Extrusions."

Figure 13:
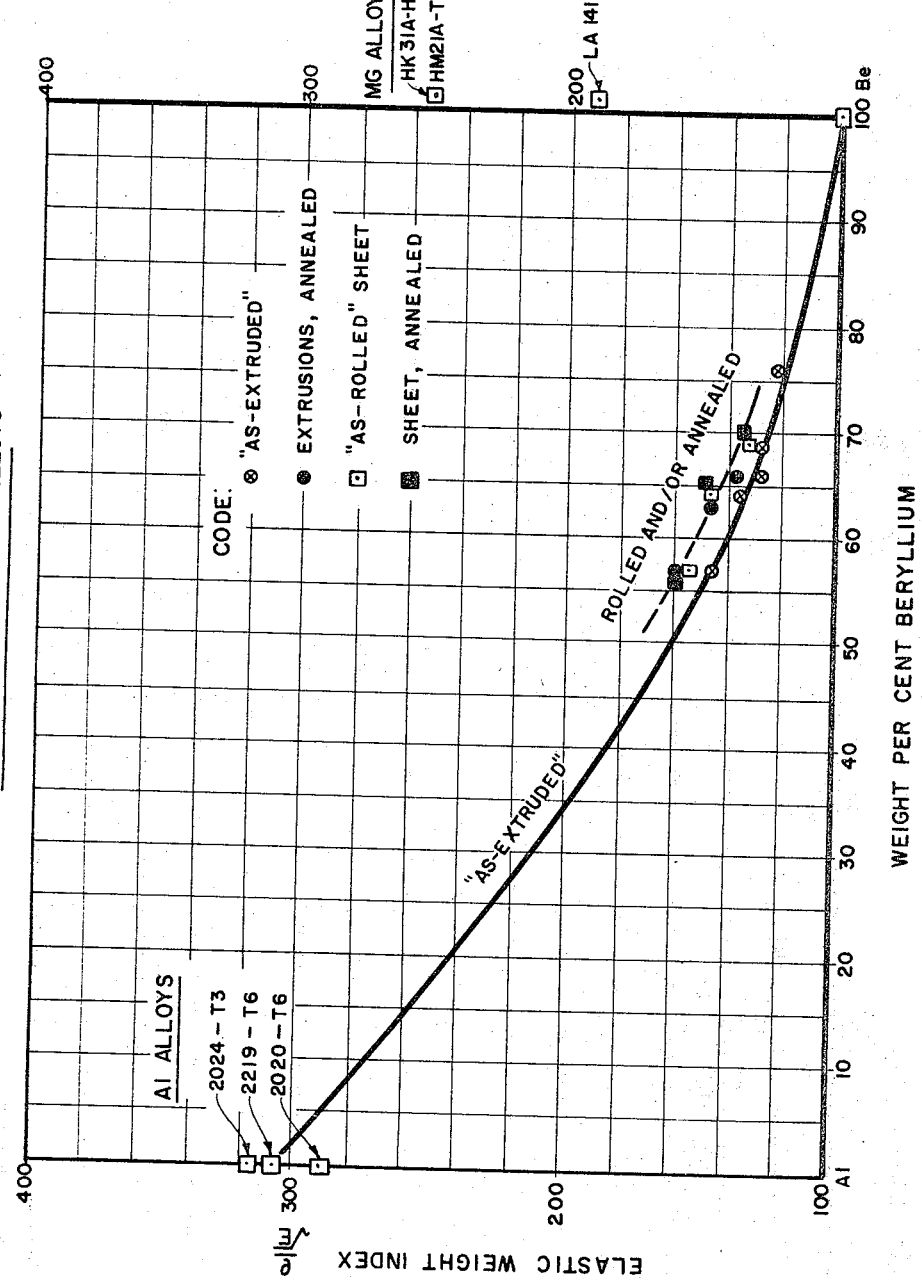

FIGURE 13 (graph) "Elastic Weight Index vs. Percent Aluminum and Process History for Be-Al Alloys."

Figure 14:
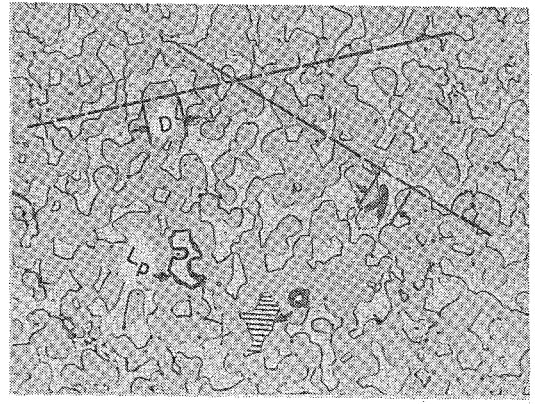

FIGURE 14 (photomicrograph) "Schematic Representation of Microstructural Features."

Figure 15:
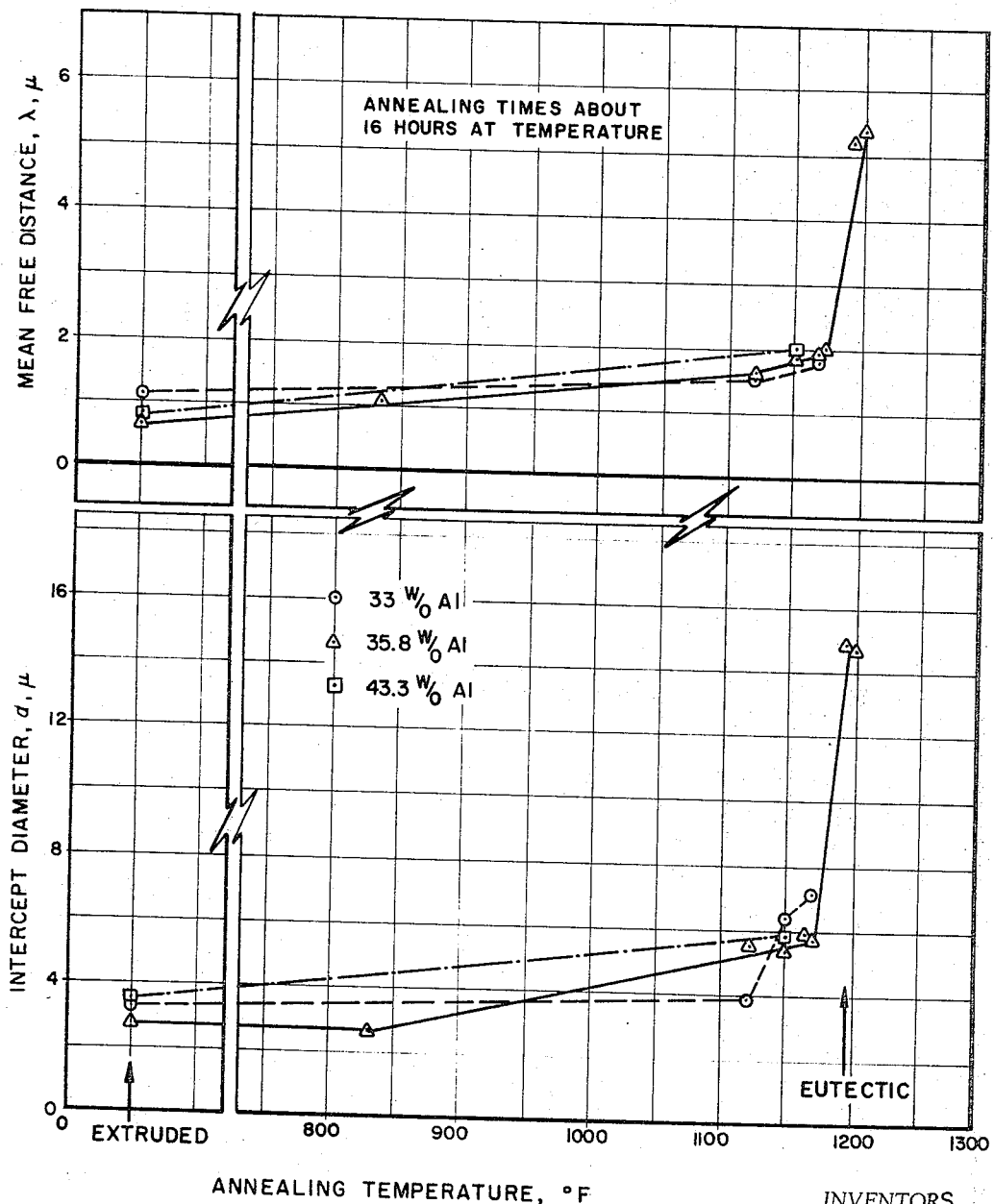

FIGURE 15 (graph) "Diameter and Mean Free Distance in Extruded Be-Al Alloys" (vs. annealing temperature degrees F.).

FIGURE 16 (graph) "Elastic Modulus and Yield Strength vs. Hardness for Be-Al Alloys" (extrusions and sheet with and without anneal).

FIGURE 17 (graph) "Hardness vs. Mean Free Distance in Extruded Alloys" (with and without an anneal).

FIGURE 18 (graph) "Elongation vs. Interface Length in Be-Al Alloys."

FIGURE 19 (graph) "Elongation vs. Various Structural Parameters for Extruded Alloys" (with and without an anneal).

FIGURE 20 (graph) "Hardness vs. Complexity Index for Extruded Alloys" (with and without an anneal).

FIGURE 21 (graph) "Elastic Modulus and Yield Strength vs. Complexity Index for Extruded Alloys" (with and without an anneal).

FIGURE 22 (graph) "An Elastic Modulus vs. Complexity Index for Rolled Alloys" (with and without an anneal).

FIGURE 23 (chart) "Detailed Bend Data for Be-Al Extrusions Compared to Cross-Rolled Beryllium Sheet."

FIGURE 24 (graph) "Bend Angle vs. Percent Elongation (in 1″ gauge length) for Be-Al Extrusions."

Figure 25:
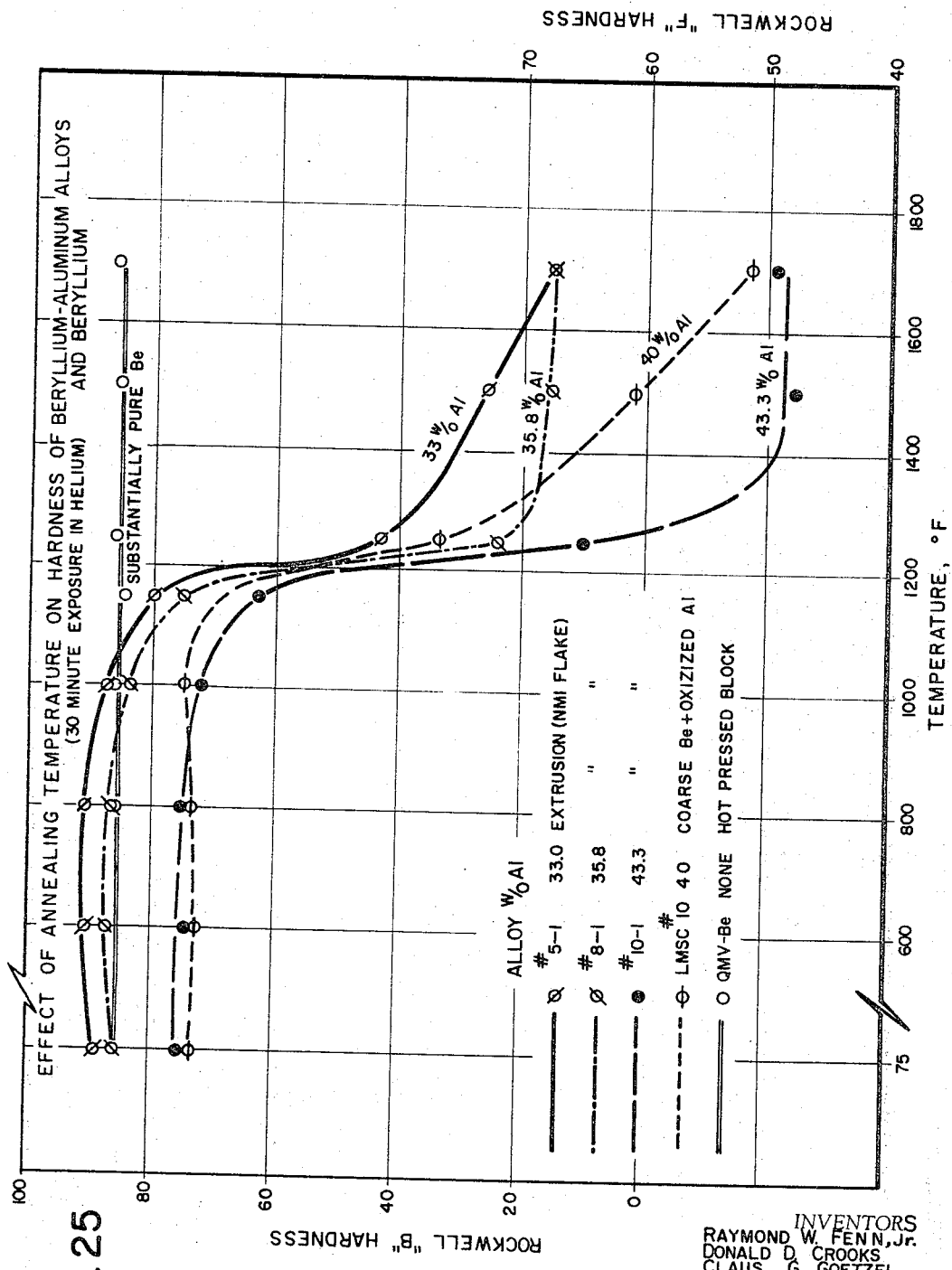

FIGURE 25 (graph) "Effect of Annealing Temperature on Hardness of Beryllium-Aluminum Alloys and Beryllium" (30 min. exposure in helium).

Figure 26:
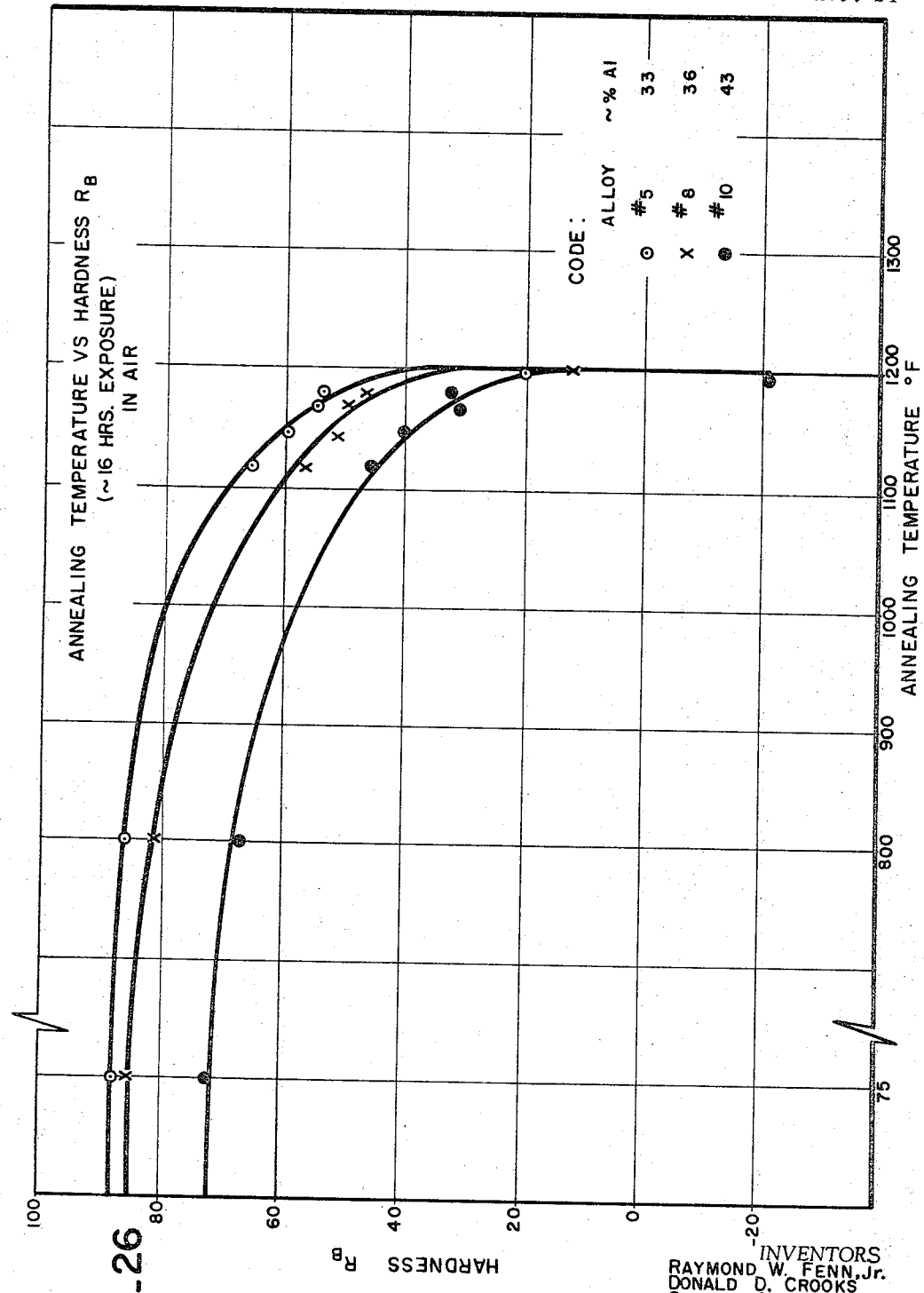

FIGURE 26 (graph) "Annealing Temperature vs. Hardness Rockwell B (about 16 hours exposure) in Air."

Figure 27:
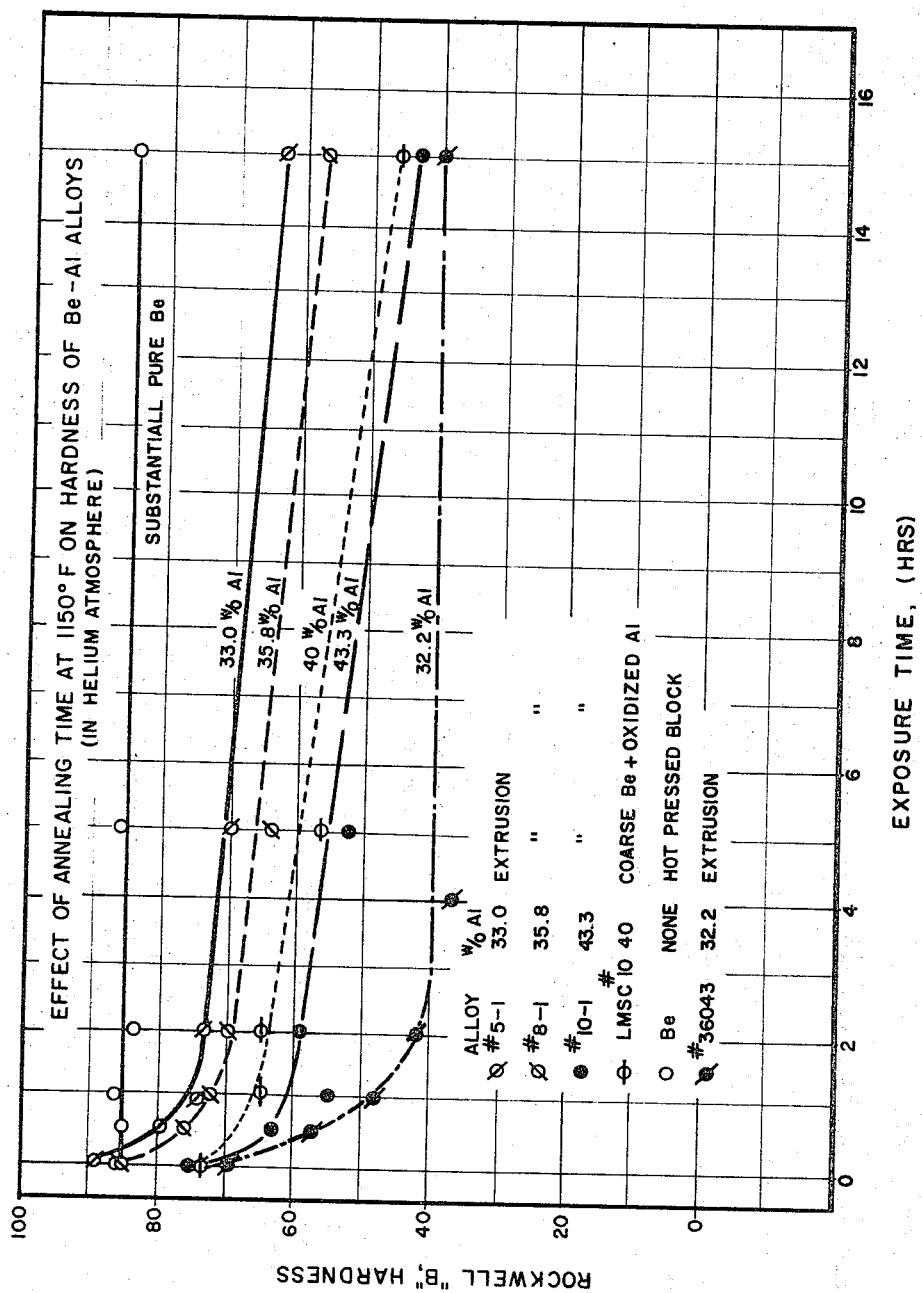

FIGURE 27 (graph) "Effect of Annealing Time at 1150° F. on Hardness of Be-Al Alloys" (extrusions in helium atmosphere).

Figure 28:
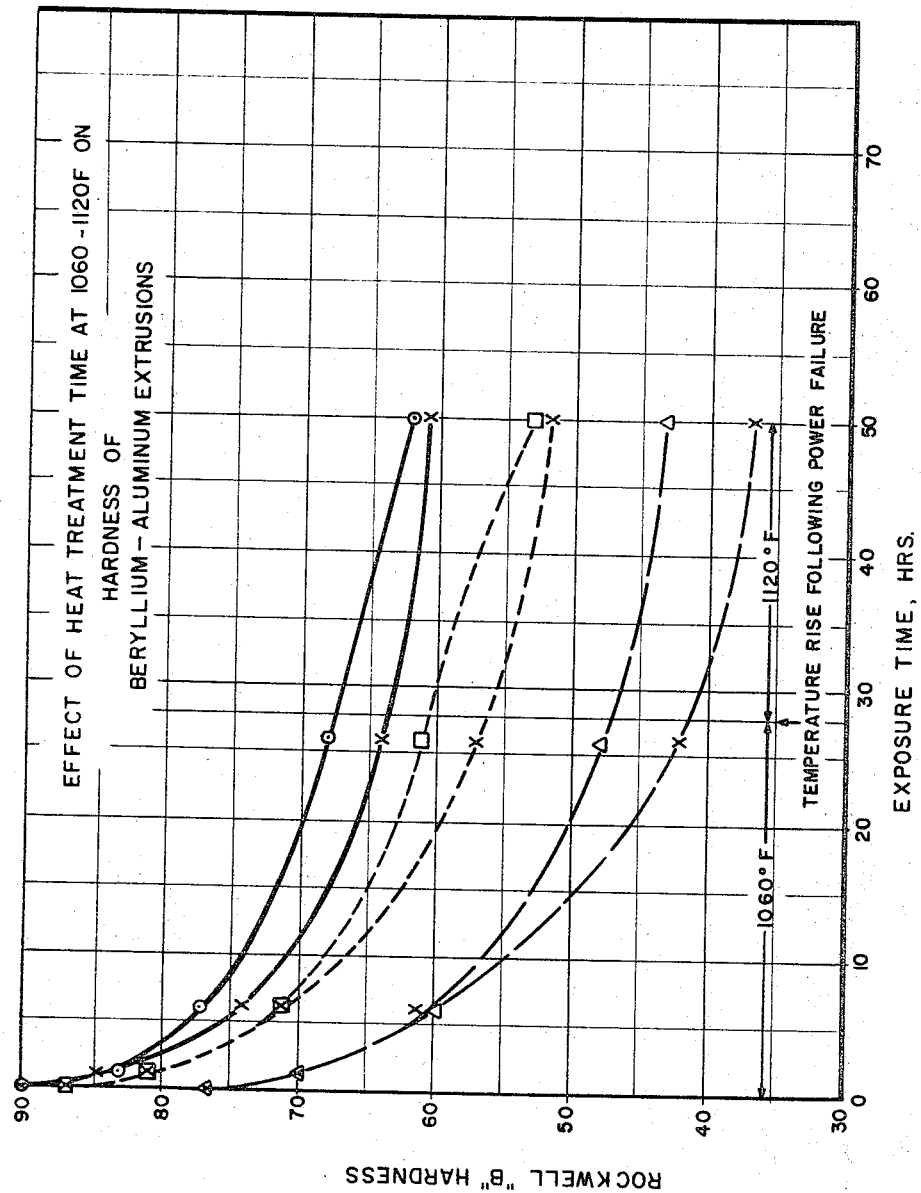

FIGURE 28 (graph) "Effect on Heat Treatment Time at 1060°–1120° F. on Hardness of Be-Al Extrusions."

Figure 29:
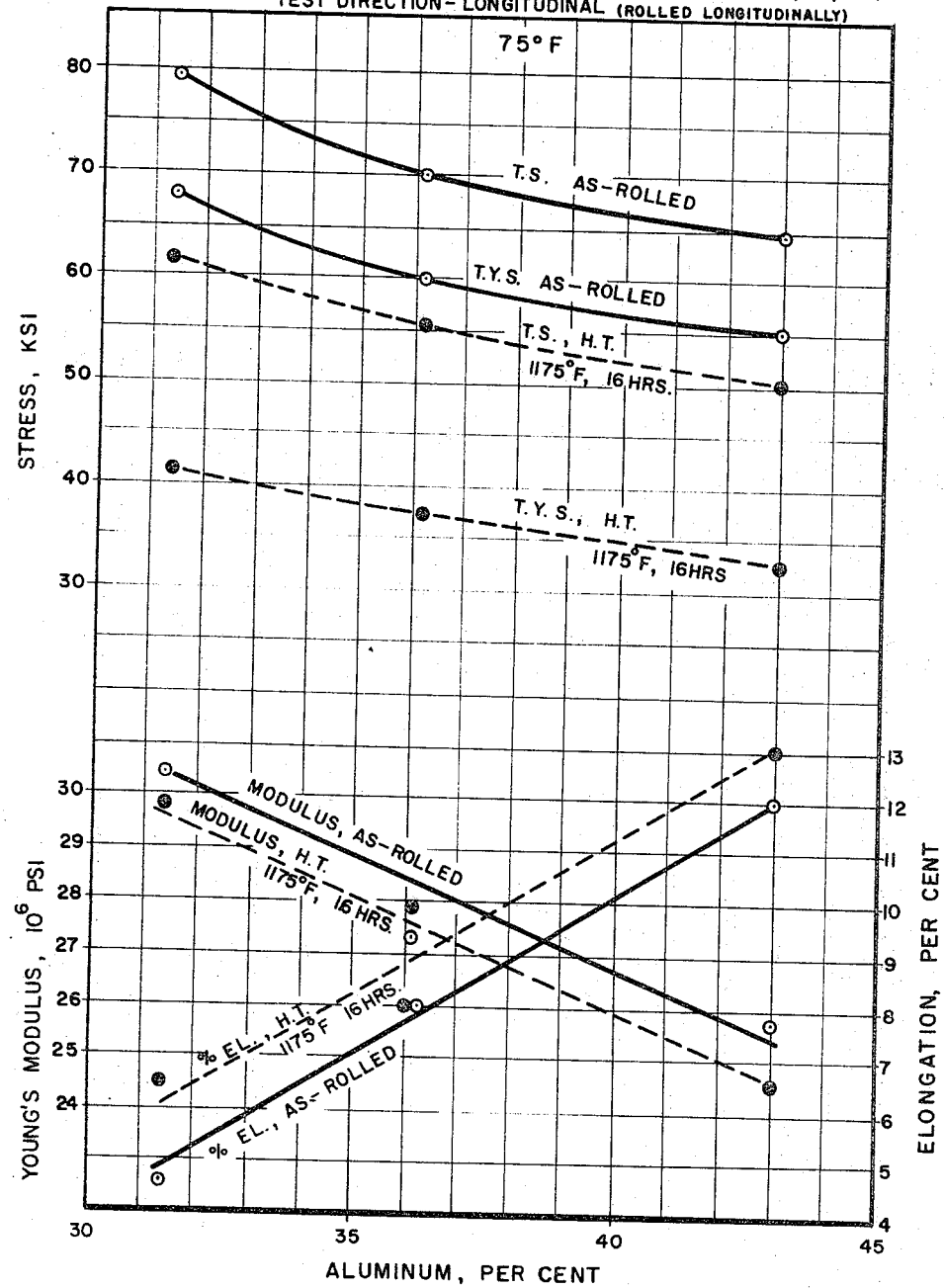

FIGURE 29 (graph) "Effect of Composition and Heat Treatment on Tensile Properties of .020″ Bel-Al Sheet (alloys #4–6, 7–6, 9–6) Test Direction Longitudinal (rolled longitudinally) 75° F."

Figure 30:
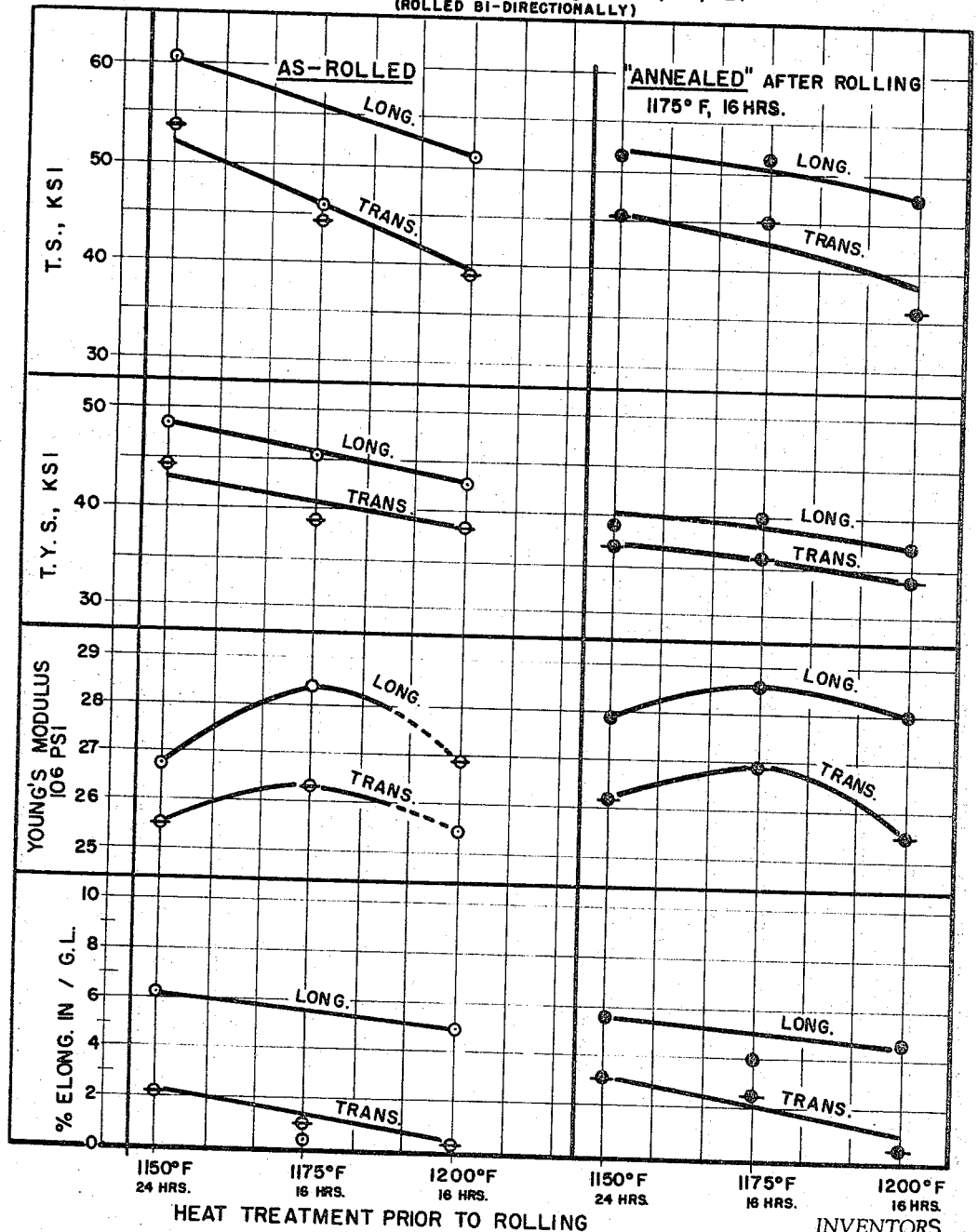

FIGURE 30 (graph) "Effect of Heat Treatment Prior to Rolling on Tensile Properties of Be-Al Sheet 0.040″, 35.8 w./percent Al (rolled bi-directionally)."

Figure 31:
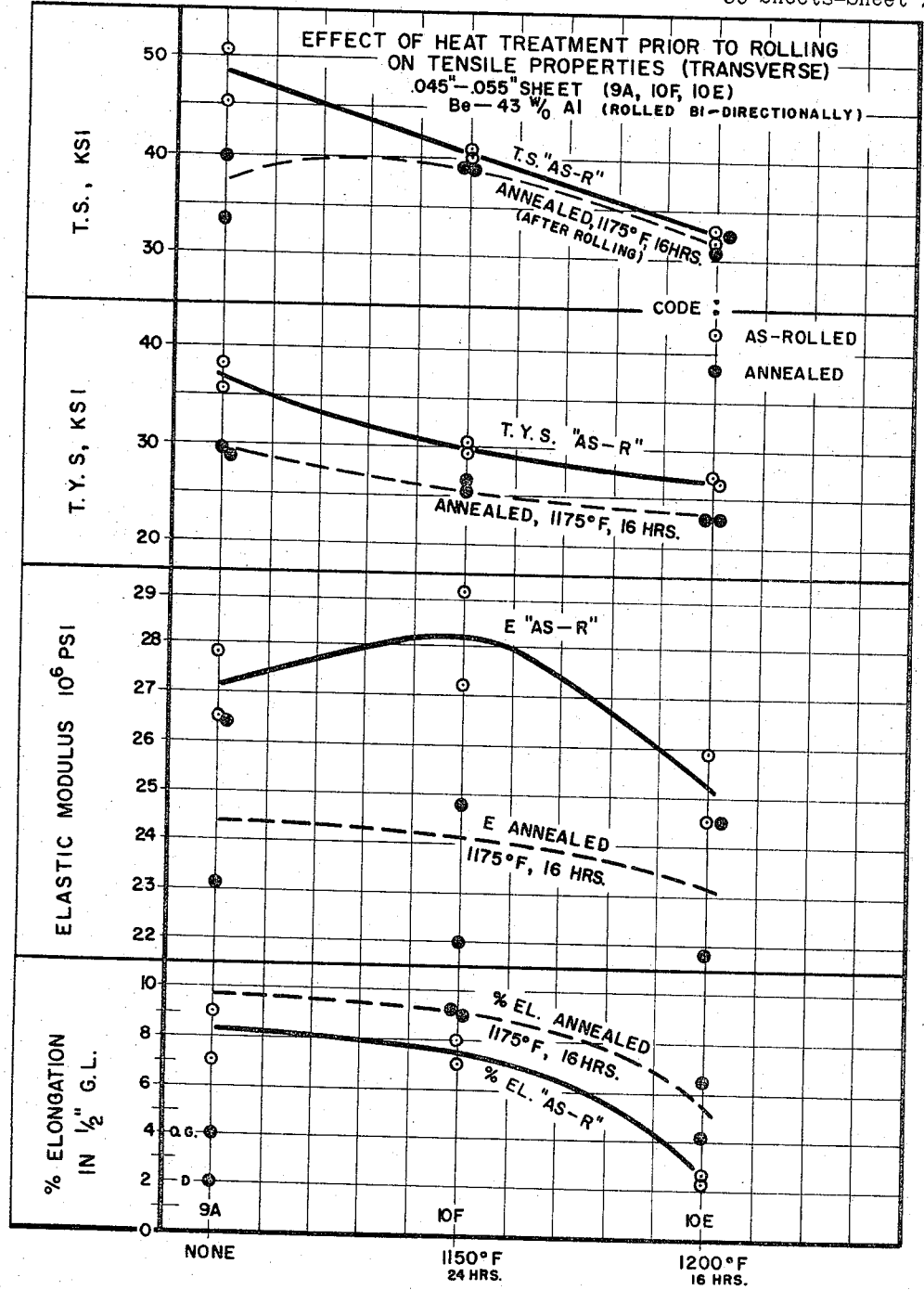

FIGURE 31 (graph) "Effect of Heat Treatment Prior to Rolling on Tensile Properties (transverse) .045″–.055 Sheet (9A, 10F, 10E) Be-43 w./percent (rolled bi-directionally)."

Figure 32:
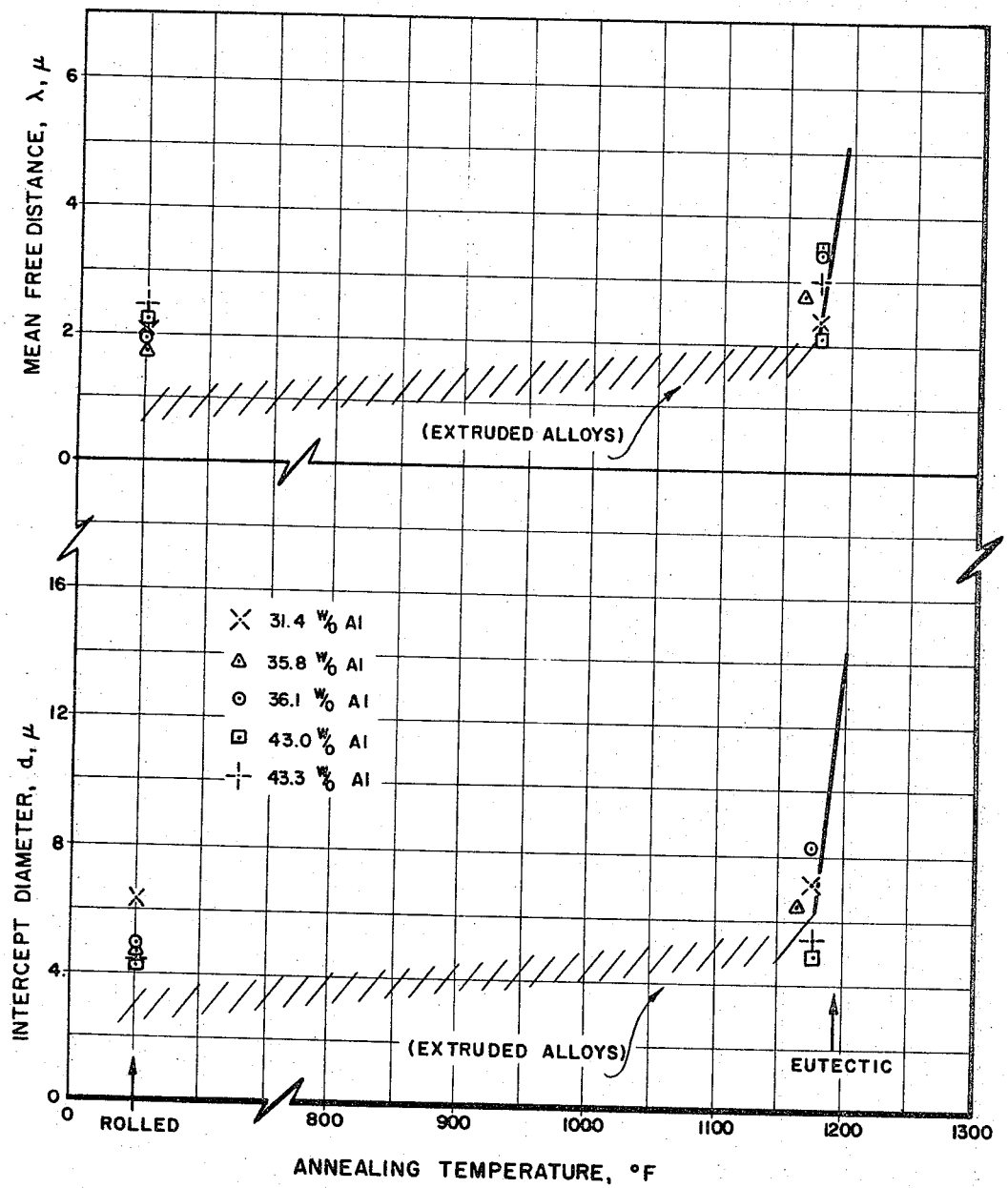

FIGURE 32 (graph) "Diameter and Mean Free Distance in Rolled Be-Al Alloys."

The invention disclosed in this application is related to beryllium-aluminum base alloys which may be used directly as structural members or which may be further treated to produce sheet, and the process for the production of such alloys. The applicants have found that the essential characteristics of their consolidated alloys are an unusually fine mixture of interdispersed beryllium and aluminum phases in which the beryllium is present as a generally particulate skeletal structure with irregular or jagged interfaces. It would appear that the compositions are not critical as such within the general range described, but rather the most important factor appears to be the obtaining of the ideal microstructure generally described above and which will be set forth in detail hereinbelow. Generally speaking, the highest possible beryllium content, consonant with good ductility and other properties, is preferred. The presence of small amounts of impurity elements is not believed to play a critical role in the invention. It should be understood, however, that applicants contemplate the possibility of providing other elements in combination with beryllium and aluminum to produce Be-Al base alloys, and such practices are considered within the parameters of the invention herein defined.

In producing the alloys of this invention the starting material preferably consists of powder or flakes of beryllium-aluminum alloy which have a microstructure characterized by an extremely fine dendritic structure of beryllium which is substantially surrounded by an aluminum phase. The alloy materials developed subsequently upon processing and extrusion also have a fine, generally particulate, beryllium phase interspersed with an aluminum phase. This generally particulate phase of beryllium is significantly smaller and finer than in previously known alloys of which applicants are aware. Moreover, the spacings between the beryllium regions is much smaller than that shown by previous investigators. Further, our process of consolidating these starting materials results in alloys with a complex irregularly-shaped beryllium phase having a much greater interface surface than in previously reported alloys.

The above will be more readily understood when considered in connection with FIGURES 2 and 3. FIGURE 2 is a photomicrograph showing a cross-section of the beryllium and aluminum phases of a typical "starting material" for Lockalloy. It will be observed that the beryllium-rich phase appears as darker colored areas which are substantialy surounded by the aluminum-rich phase. The beryllium phase, generally dendritic in nature, appears, as one would expect in a two-dimensional photomicropgraph, as a generally "particulate" structure. This distinction between the two-dimensional appearance in photomicrographs and the three-dimensional reality exhibited thereby should be kept in mind throughout the discussion included herein. The photomicrographs are taken from sections through the material concerned and the dark beryllium phases shown are the results of taking such sectional representation across what may be compared, e.g., to the needles of a pine tree. FIGURE 3 is a photomicrograph of a typical alloy which has been extruded from a starting material such as shown in FIGURE 2. It will be noted that the beryllium-rich regions in the extrusion are somewhat larger and the interfaces are less "complex" than in the starting material. This occurs as a result of the heat, pressure and working of the material according to the process of the present invention.

It should be understood that the invention may also be practiced and alloys produced in accordance with the teachings hereof when a starting material of powdered and intimately intermixed portions of extremely fine particles of beryllium and aluminum is employed.

By creating an alloy with small beryllium "particles," surrounded by aluminum or an aluminum-rich phase, subsequent deformation is enhanced, compared to pure beryllium since the beryllium phase is not restrained by adjacent beryllium grains. Rather, the aluminum-rich phase acts essentialy as a lubricant, permitting smooth and extensive deformation of the composite structure. This allows greater elongation to be achieved, improves the ductility and lowers the sensitivity to surface damage and cracking. Moreover, the intimate mixture of extremely fine complex beryllium and aluminum phases results in a stiffer material with higher moduli of elasticity than is possible to obtain with the alloys described in the prior literature. Manifestly, then, the invention consists not only of the definition of optimum microstructures which will allow the control of mechanical properties of beryllium-aluminum based alloys, but also a method of processing and heat treating a starting material of prescribed microstructure to produce other desirable microstructures which result in improved ductility with only a small, and acceptable, sacrifice in elastic modulus.

Once the desired microstructure has been produced, it is essential that its character not be altered by melting such as would be the case during heating, sintering, hot pressing, extrusion, or rolling at temperatures above that of the beryllium-aluminum eutectic temperature, which, as close as can be determined, is 1193° F. Heating above 1193° F. would tend to agglomerate the dispersions of the beryllium in the matrix, thereby causing a loss of the beneficial effects resultant from the small particle size and shapes described above.

According to our invention a starting material, preferably of beryllium-aluminum alloy powder, is produced by one or more of the following techniques:

EXAMPLE I

Fine beryllium powder, not coarser than 200 mesh, and preferably all passing through a 325 mesh sieve, having a maximum oxygen content (as BeO) of 2%, was coated with a film of aluminum by attrition milling in a dry argon atmosphere for 24–28 hours. The jar of the mill consists of unalloyed aluminum, and the load was applied by balls or preferably cylinders or slugs of pure aluminum. In order to furnish adequate weight, the balls or cylinders of aluminum may be hollowed out and filled with a heavy metal such as lead or tungsten before sealing with small aluminum plugs. If the aluminum content is to exceed 5%, free aluminum powder of —325 mesh size or flake aluminum powder of a maximum oxide surface content of 16% by volume is added to the mill charge in amounts up to 50% of the beryllium powder charge. The milling operation is stopped when the desired thickness of the coating of aluminum on the beryllium is attained. It is important that all beryllium powders be fully coated. The aluminum content of the coated powder should be not more than 50%, and preferably between 24% and 36% by weight. It is desirable that the tenacious oxide films surrounding the beryllium particles be disrupted or sheared off during attrition milling. Cylindrical or polygonal aluminum slugs have sharp corners or projections and are advantageous in this respect. Using this procedure, particles of beryllium coated with aluminum were produced, which powder had an aluminum content within the ranges desired, and of a size and having characteristics of modulus of elasticity of approximately $26.8 \times 10^6$ to $27.8 \times 10^6$ p.s.i.

EXAMPLE II

Beryllium metal can be melted in a suitable refractory crucible, such as beryllia, under a protective atmosphere of dry argon or helium. The aluminum is added to the molten bath and the melt vigorously stirred by mechanical means (or eddy currents). The homogenized melt is then "atomized" through a suitable refractory nozzle and the droplets of alloy allowed to cool in such a manner as to yield solid, spheroidal particles, each of which contains essentially the same microstructure. (Suitable alloy particles can also be made by many other methods, e.g.: (1) by cross-jetting a molten stream of metal with a high pressure inert gas to obtain generally spheroidal shaped particles or a slightly reactive gas to get specially shaped particles, (2) by wheel atomizing in a controlled atmosphere whereby a molten stream of metal is poured onto a wheel which is caused to rotate at high speeds by a cooling gas of the desired composition to produce particles of a selected size by controlling the speed of the rotating wheel, and (3) by cross-jetting a liquid stream of metal with pressurized gas so as to impact on a cold rotating dish or drum, thereby producing a "splat" type of shot particle). This microstructure consists of small beryllium rich dentrites embedded in an aluminum-rich phase, both of which may be so fine that they may not be resolved with an optical microscope up to 1,500 diameters magnification. The beryllium-rich phase should be arranged in a dendritic pattern, but should preferably not exceed 10 microns in size, and preferably be on the order of 1–4 microns. Since the cooling rate determines the size and distribution of the dendrites in the beryllium phase it is desirable that the droplets be cooled rapidly. If the cooling conditions of the atomized droplets are such that the distribution of the beryllium dendrites in the matrix inside the droplets is not uniform and similar from one to another, it is preferred that the atomized droplet be subjected to a second fusion treatment. A reheat of these droplets, even for a short time, above the eutectic temperature, but below the liquidus temperature of the particular composition, will cause liquifaction of the matrix and promote a tendency toward a more uniform distribution of the solid beryllium dendrites within each alloy droplet to take place due to the action of the interfacial tension. At the same time, the beryllium phase will tend to attain an increasingly spheroidal shape due to diffusion, solution and precipitation processes. If at the same time a directional force is applied, such as produced by the gas stream of a spray gun, the spheroidal droplets will tend to elongate and align themselves in the direction of the force of the gas stream.

If the cooling conditions of the atomized powder are such that not only the distribution of the beryllium dendrites inside the alloy powder is non-uniform; but the powder itself is non-uniform in size and shape, or is platelike or porous and discontinuous, it is preferred that the atomized powder be subjected to an intensive fusion treatment. In this event the powder particles are to be heated for a short period of time above the liquidus temperature of the particular composition. Regardless of the temperature, the powder particles or liquid alloy droplets must be protected from oxidation or contamination by means of a controlled atmosphere, such as provided by a suitable spray pistol, or plasma gun or powder welding torch. Another suitable heating technique consists of feeding, at a controlled rate, the powder into a vertical shaft furnace whose heating zone is at the desired temperature, and through which the protective gas atmosphere passes in counterstream. Since the specific gravity of the beryllium-aluminum alloy powder is relatively low, i.e., on the order of 2 gms. per cc., their rate of fall is low, and their time in the liquid or the semi-liquid state can be readily controlled by manipulating the flow of the gas stream.

The atomized powder, either with or without having been subjected to a fusion heat treatment, is then consolidated and mechanically worked, all in accordance with the teachings of the invention.

EXAMPLE III

Pure aluminum, 99.99%, and substantially pure lump beryllium were melted to form an alloy which was poured at approximately 1400° C. into a preheated graphite pouring cup. The molten metal flowed out a hole in the bottom of the pouring cup where it was dispersed and rapidly cooled by a horizontal jet of pressurized argon in an air atmosphere which produced a generally flake type powder mixture of alloy. The size of the alloy powders or "flake" thus produced may be varied as a function of the pressure of the gas applied.

Utilizing "starting materials" produced in accordance with the examples noted above alloys according to the hereindefined invention were produced.

The tables below show mechanical properties, densities, and production conditions:

TABLE I.—MECHANICAL PROPERTIES AND DENSITY OF Be-Al LOCKALLOYS

[Tensile Test Data]

| Alloy No. | Heat Treat. | Test Temp. (° F.) | E, 10⁶ p.s.i. | T.Y.S., K.s.i. | T.S., K.s.i. | Elong., Percent |
|---|---|---|---|---|---|---|
| 24.3% Al; density=2.00 gm./cc.; (0.0722 lb./in.³) | | | | | | |
| L-2 | As Ext | 75 | 38.0 | 76.8 | 81.0 | 2.0 |
| L-2 | As Ext | 75 | 37.0 | 72.3 | 87.6 | 2.6 |
| L-2 | As Ext | 735 | | 39.1 | 40.7 | 1.9 |
| L-2 | As Ext | 740 | 36.2 | 35.1 | 36.9 | 1.7 |
| 31.2% A.; density=2.05 gm./cc.; (0.074 lb./in.³) | | | | | | |
| L-1 | As Ext | 75 | 32.3 | 59.3 | 68.5 | 5.8 |
| L-1 | As Ext | 75 | 33.4 | 60.5 | 61.8 | 0.3 |
| L-1 | 1,180 F., 35 min | 75 | 30.8 | 47.0 | 57.7 | 3.2 |
| L-3 | | 75 | | 78.4 | 80.4 | 1.0 |
| L-3 | As Ext | 75 | 33.8 | 78.4 | 83.8 | 2.3 |
| L-3 | As Ext | 75 | 34.5 | 77.5 | 81.9 | 2.3 |
| L-3 | 1,180 F., 35 min | 75 | 33.2 | 55.1 | 67.7 | 4.2 |
| L-6 | As Ext | 75 | 33.2 | 83.0 | 84.2 | 0.3 |
| L-6 | As Ext | 75 | 35.0 | 84.7 | 86.1 | 0.3 |
| L-6 | 1,100 F., 3 hr | 75 | 32.8 | 55.5 | 57.9 | 1.1 |
| L-1 | As Ext | 800 | | (*) | 21.6 | 0.1 |
| L-3 | As Ext | 770 | | 33.2 | 34.4 | 2.8 |
| L-6 | As Ext | 710 | 27.3 | 32.2 | 34.8 | 1.7 |

*Did not reach 0.2% offset yield.

TABLE II.—TENSILE AND BEND PROPERTIES OF EXTRUDED Be-Al ALLOYS 75° F., LONGITUDINAL DIRECTION

| Alloy and Spec. No. | Al (wt. percent) | Density | | Condition | E⁶, 10 p.s.i. | T.Y.S., K.s.i. | T.S., K.s.i. | Percent Elong. (1 in. G.L.) | Bend Angle in degrees, (t=.057″) | | |
|---|---|---|---|---|---|---|---|---|---|---|---|
| | | gm./cc. | lb./in.³ | | | | | | Width 1.25″ | Width .50″ | Width .25″ |
| #5 | 33.0 | 2.05 | 0.0745 | As Extruded | 33.7 | 76.2 | 82.3 | 4.0 Dᵃ | 8 | 14 | 33 |
| | | | | 16 hr., 1,125° F | 33.0 | 61.1 | 69.5 | 5.5 D | | | |
| | | | | 16 hr., 1,150° F | 29.2 | 42.8 | 60.5 | 9.0 O.G.ᵇ | 51 | 73 | 76 |
| | | | | 16 hr., 1,125° F.+11½ hr., 1,175° F. to 1,225° F. | 29.2 | | | | | | |
| | | | | 11½ hr., 1,175° F. to 1,225° F | 28.3 | 23.4 | 46.4 | 11.0 | | | |
| #8 | 35.8 | 2.07 | 0.075 | As Extruded | 32.2 | 75.3 | 75.8 | 1.2 | 15 | 12 | 5 |
| | | | | 16 hr., 1,125° F | 30.0 | 57.8 | 59.3 | 0.4 O.G. | | | |
| | | | | 16 hr., 1,150° F | 27.8 | 42.6 | 53.1 | 9.0 | 50 | 59 | 76 |
| | | | | 16 hr., 1,125° F.+11½ hr., 1,175° F. to 1,225° F. | 27.9 | 22.8 | 39.2 | 6.0 D | | | |
| | | | | 11½ hr., 1,175° F. to 1,225° F | 27.3 | | | | | | |
| #10 | 43.3 | 2.14 | 0.077 | As Extruded | 28.6 | 63.4 | 68.6 | 1.5 | 17 | 17 | 27 |
| | | | | 16 hr., 1,125° F | 28.2 | 47.2 | 51.1 | 6.5 | | | |
| | | | | 16 hr., 1,150° F | 24.7 | 35.9 | 43.1 | 9.0 ᶜ | 56 | 65 | 81 |
| | | | | 16 hr., 1,125° F+11½ hr., 1,175° F. to 1,225° F. | 23.4 | | | | | | |
| | | | | 11½ hr., 1,175° F. to 1,225° F | 23.3 | 19.4 | 35.0 | 10.5 O.G. | | | |
| Be Extrusion | | | | As Extruded and Polished | | | | | 7 | 9 | 8 |

ᵃ D=Defect observed in fracture.   ᵇ O.G.=Failed outside gage length.   ᶜ ½″ Gage length; all others=1″ gage length.

TABLE III.—PHYSICAL PROPERTIES OF Be-Al ALLOYS

| Composition, wt. percent Al | Density (Actual) | | Percent Theoretical Density | Specific Heat, Cal./gm./° C. Rt-200° C. | History | Solar Absorptance, α_s Finish | | Emittance, ε_N Finish | | | Thermal Cond., Cal./cm.-sec.-° C. | Thermal Expansion, in./in./° F. to 300° F. |
|---|---|---|---|---|---|---|---|---|---|---|---|---|
| | gm./cc. | lb./in.³ | | | | 4/0 | 1μ | 320 grit polish | 4/o grit polish | 1μ grit | | |
| 24.3 | 2.00 | 0.0722 | 98.3 | 0.47±.07 | | | | | | | | |
| 33.0 | 2.05 | 0.0745 | 98.4 | 0.417±.016 | As Extruded | 0.67 | | 0.08-0.09 | 0.07 | | 0.462 | 9×10⁻⁶ |
| | | | | 0.399±.005 | 1,150° F., 24 hr | 0.65 | | 0.08-0.09 | 0.07 | | | |
| | | | | | 1,200° F., 16 hr | 0.60 | | 0.08-0.09 | 0.07 | | | |
| 35.8 | 2.074 | 0.075 | 97.5 | 0.42±.07 | As Extruded | 0.72 | .43 | 0.08-0.09 | 0.07 | 0.04 | | |
| 36.1 | | | | 0.396±.017 | 1,150° F., 24 hr | 0.67 | | 0.08-0.09 | 0.07 | | 0.51 | 9.2×10⁻⁶ |
| | | | | | 1,200° F., 16 hr | 0.62 | | 0.08-0.09 | 0.07 | | | |
| 43.3 | 2.136 | 0.077 | 97.0 | 0.388±.012 | As Extruded | 0.74 | | 0.08-0.09 | 0.07 | | | |
| | | | | | 1,150° F., 24 hr | 0.68 | | 0.08-0.09 | 0.07 | | 0.455 | 8.9×10⁻⁶ |
| | | | | | 1,200° F., 16 hr | 0.61 | | 0.08-0.09 | 0.07 | | | |

TABLE IV.—SUMMARY OF Be-Al LOCKALLOY PRODUCTION CONDITIONS [1]

| Lockalloy | Extrusion No. | Melt No. | Composition, w/o Al | Melt Yield, percent [2] | Densification Conditions | | | Temperatures, °F. | | | Ram Speed (in./min.) | Pressure Running (tons) | Liner I.D. (in.) | Die Size (in.) | Reduction Ratio |
|---|---|---|---|---|---|---|---|---|---|---|---|---|---|---|---|
| | | | | | Cold Compaction tons/sq. in. | Hot Compaction Conditions | Can Material | Billet | Ext. Liner | Die | | | | | |
| Phase I: | | | | | | | | | | | | | | | |
| L-1 | L-1 | MX 702 | 31.2 | 87.8 | 48 | Evacuated and Sealed (No Hot Compacting Step). | 16 gauge steel. | 1,100 | | | 35 | 166 | 2.040 | .525φ | 14.5:1 |
| L-2 | L-2 | 700 | 24.3 | 85.9 | 48 | do | do | 1,050 | | | 15 | 196 | 2.040 | .525φ | 14.5:1 |
| L-3 | L-3 | 702 | 31.2 | 87.8 | 48 | do | do | 950 | | | 15 | 209 | 2.040 | .525φ | 14.5:1 |
| L-4 | L-4 | 702 | 31.2 | 85.9 | 48 | do | do | 950 | | | 15 | 250 | 2.040 | .2 x 1.1 | 18:1 |
| L-5 | L-5 | 700 | 24.3 | 85.9 | 48 | do | do | 1,050 | | | 15 | 236 | 2.040 | .75 x .25 | 18:1 |
| L-6 | L-6 | 702 | 31.2 | 87.8 | 48 | do | Copper | 900 | | | 15 | 193 | 2.040 | .525φ | 14.5:1 |
| L-7 | L-7 | 702 | 31.2 | 87.8 | 48 | do | Steel | 950 | | | 15 | 265 | 2.040 | .75 x .25 | 18:1 |
| L-8 | L-8 | 702 | 31.2 | 87.8 | 48 | do | Copper | 900 | | | 15 | 230 | 2.040 | .75 x .25 | 18:1 |
| L-9 | L-9 | 700 | 24.3 | 85.9 | 48 | do | do | 900 | | | 15 | 240 | 2.040 | .75 x .25 | 18:1 |
| Phase II: | | | | | | | | | | | | | | | |
| 4 | 36023 | MX 782 | 31.4 | 76.8 | 28.4 | 900° F. VAC; +1.5 hr. 1,000° F., + 85 tons/in.² | 16 gauge copper. | 1,025,~2 hr. | 800 | | 20 | 480 | 3.050 | .25 x 1.5 | 19.5:1 |
| 5 | 36297 | 783 | 33.0 | 70.7 | 28.4 | do | do | 1,025,~2 hr | 800 | | 20 | 440 | 3.050 | .25 x 1.5 | 19.5:1 |
| 7 | 36298 | 827 | 36.1 | 82.5 | 28.4 | do | do | 1,025,~2 hr | 800 | | 20 | 405 | 3.050 | .25 x 1.5 | 19.5:1 |
| 8 | 36299 | 828 | 35.8 | 72.1 | 28.4 | do | do | 1,025,~2 hr | 800 | | 20 | 380 | 3.050 | .25 x 1.5 | 19.5:1 |
| 9 | 36300 | 829 | 43.3 | 84.0 | 28.4 | do | do | 1,025,~2 hr | 800 | | 20 | 360 | 3.050 | .25 x 1.5 | 19.5:1 |
| 10 | 36301 | 830 | 43.3 | 80.0 | 28.4 | do | do | 1,025,~2 hr | 800 | | 20 | 338 | 3.050 | ⅛ x ½ | 25:1 |
| 20 | 36043 | | 32.2 | | | do | do | 1,020,~2 hr | 800 | | | | 3. 1⅛ | | |
| Phase III: | | | | | | | | | | | | | | | |
| 36819 | 36819 | B1039 | 33.0 | 80.5 | 57 | 8 hr. 900° F. VAC; +2 hr. 1,000° F., +113 tons/in.² +400° F. ~3 hr. (Vacuum). | .128″ Cu. | 1,015,~2½ hr. | 725 | 725 | 20 | 480–525 | 2.800 | 1.36 x 1.48 I. | 21:1 |
| 36820 | 36820 | B1039 | 33.0 | 80.5 | 57 | do | .125″ Cu. | 910, 2½ hr. | 725 | 725 | 20 | 400–430 | 2.800 | 1.36 x 1.48I | 21:1 |
| 36844 | 36844 | B1050 | 31.4 | 72.2 | 57 | do | .125″ Cu. | 870, 2½ hr. | 725 | 725 | 13 | 340–350 | 2.800 | 1.36 x 1.48I | 21:1 |
| 36857 | 36857 | B1056 | 33.0 | 72.1 | 57 | do | .250″ Cu. | 820, ~2½ hr. | 725 | 725 | 13 | 320–410 | 2.800 | 1.36 x 1.48I | 21:1 |
| 36858 | 36858 | B1054 | 41.7 | 78.5 | 57 | do | .250″ Cu. | 820, ~2½ hr. | 725 | 725 | 13 | 380–410 | 2.800 | 1.36 x 1.48I | 21:1 |
| 36842 | 36842 | B1039 +3M | 33.0 | 80.5 | 57 | do | .062″ Cu. | 1,000, 2½ hr. | 725 | 900 | 13 | 320–330 | 2.800 | .25 x 1.5 | 16.4:1 |
| 36843 | 36843 | B1047 3+14M coarse, med | 31.0 | 72.9 | 57 | do | .062″ Cu. | 840, 2½ hr. | 725 | 900 | 13 | 400 | 2.800 | .25 x 1.5 | 16.4:1 |
| 36852 | 36852 | B1039 B1054 | 31.0 | 80.5 | 57 | do | .062″ Cu. | 825, 2½ hr. | 725 | 900 | 13 | 320–340 | 2.800 | .25 x 1.5 | 16.4:1 |
| 36853 | 36853 | B1056 | 41.7 | 78.5 | 57 | do | .062″ Cu. | 825, 2½ hr. | 725 | 900 | 13 | 360–380 | 2.800 | .25 x 1.5 | 16.4:1 |
| 36854 | 36854 | B1047 14M fine. | 31.0 | 72.9 | 57 | do | .062″ Cu. | 815, 2½ hr. | 725 | 900 | 13 | 410–415 | 2.800 | .25 x 1.5 | 16.4:1 |
| 36855 | 36855 | B1057 | 26.9 | 73.8 | 57 | do | .062″ Cu. | 815, 2½ hr. | 725 | 900 | 13 | 500 | 2.800 | .25 x 1.5 | 16.4:1 |
| 36845 | 36845 | B1050 | 31.4 | 72.2 | 57 | do | .187″ Cu. | 870, 2½ hr. | 725 | 900 | 13 | 490 | 2.800 | .125 x 1.5 | 32.8:1 |
| 36856 | 36856 | B1057 | 26.9 | 73.8 | 57 | do | .250″ Cu. | 875, 2½ hr. | 725 | 900 | 13 | 475 | 2.800 | .125 x 1.5 | 32.8:1 |

[1] See Ref. 2, 3 and 4 for additional details.  [2] 2–4.5 lb. melts.

TABLE V.—SUMMARY OF TENSILE DATA FOR Be-Al SHEET ROLLED FROM 1,150° F. FURNACE

| Material Description | H.T. Prior to Rolling | Rolling Direction | H.T. After Rolling | Longitudinal Properties | | | | Transverse Properties | | | |
|---|---|---|---|---|---|---|---|---|---|---|---|
| | | | | E, 10⁶ p.s.i. | T.Y.S., K.s.i. | T.S., K.s.i. | Elong, Percent | E, 10⁶ p.s.i. | T.Y.S., K.s.i. | T.S., K.s.i. | Elong, Percent |
| 4 —.020", 31.4% Al | None | 80% Red. Long | None | 30.4⁴ | 67.4 | 79.1 | 4.6 | | | | |
| 4 —.020", 31.4% Al | do | 80% Red. Long | 1,175° F., 16 hr | 29.8³ | 41.0 | 61.1 | 6.5 | | | | |
| 7 —.020", 36.1% Al | do | 80% Red. Long | None | 27.3⁴ | 59.5 | 69.7 | .8 | | | | |
| 8F —.040", 35.8% Al | 1,150° F., 24 hr | 27% Red. L., 54% Red. T | do | 26.4 | 48.8 | 60.8 | 6.2 | 25.6 | 44.5 | 54.0 | 2.3 |
| 8G —.040", 35.8% Al | 1,175° F., 16 hr | 27% Red. L., 54% Red. T | do | 28.4 | 45.4 | 46.3 | 5.0 | 26.4 | 39.0 | 44.5 | 1.0 |
| 8E —.040", 35.8% Al | 1,200° F., 16 hr | 27% Red. L., 54% Red. T | do | 25.5 | 42.9 | 52.8 | 6.0 | 26.9 | 38.4 | 39.1 | 0.2 |
| 7 —.020", 36.1% Al | None | 80% Red. Long | 1,175° F., 16 hr | 27.9² | 37.1 | 55.4 | 8 | | | | |
| 8F —.040", 35.8% Al | 1,150° F., 24 hr | 27% Red. L., 54% Red. T | 1,165° F., 16 hr | 27.9 | 39.2 | 51.9 | 5.0 | 26.2 | 37.0 | 45.2 | 3.2 |
| 8G —.040", 35.8% Al | 1,175° F., 16 hr | 27% Red. L., 54% Red. T | 1,165° F., 16 hr | 28.6 | 39.0 | 51.6 | 5.0 | 26.6 | 36.0 | 45.0 | 2.5 |
| 8E —.040", 35.8% Al | 1,200° F., 16 hr | 27% Red. L., 54% Red. T | 1,165° F., 16 hr | 28.0 | 37.0 | 47.5 | 4.5 | 26.5 | 33.8 | 36.0 | 0.3 |
| 9 —.020", 43.0% Al | None | 80% Red. Long | None | 25.8⁴ | 55.0 | 64.2 | 12 | | | | |
| 10F —.050", 43.3% Al | 1,150° F., 24 hr | 25% Red. L., 50% Red. T | do | 24.2⁶ | 36.8 | 44.4 | 4D | | | | |
| 10E —.050", 43.0% Al | 1,200° F., 16 hr | 25% Red. L., 50% Red. T | do | | | | 13 | 27.2¹² | 37.2² | 47.9² | 8 |
| 7A —.020", 43.0% Al | None | 80% Red. Long | 1,175° F., 18 hr | 24.6² | 32.6 | 50.3 | | 28.2¹² | 30.2² | 40.2² | 7.5 |
| 9 —.020", 43.0% Al | 1,150° F., 24 hr | 25% Red. L., 50% Red. T | 1,175° F., 18 hr | | | | | 25.2 | 27.2² | 32.0² | 2.4 |
| 10F —.050", 43.3% Al | 1,200° F., 16 hr | 25% Red. L., 50% Red. T | 1,175° F., 18 hr | | | | | 24.8¹² | 29.4 | 36.5 | 3 |
| 10E —.050", 43.3% Al | 1,200° F., 16 hr | 25% Red. L., 50% Red. T | 1,175° F., 18 hr | | | | | 23.4² | 26.4 | 38.8 | 9.1 |
| | | | | | | | | 23.2² | 23.2 | 31.4 | 5.3 |

NOTE.—Superscript=Number of tests. D=Defect in fracture.

TABLE VI.—STRUCTURAL PARAMETERS FOR Be-Al EXTRUSIONS

| Composition | Anneal, °F./hr. | Sheet No. | $f_{Al}$ | $\lambda, \mu$ | $d, \mu$ | $P_L, mm^{-1}$ | $l_{A}, mm^{-1}$ | $N_{A}, mm^{-2}$ (×1,000) | $a, \mu^2$ | DPH | $l_p, \mu$ | $\bar{l}, \mu$ | S.I. | E.I. | C.I. | E·10⁶ | Y.S., K.s.i. | T.S., K.s.i. | Elong, Percent |
|---|---|---|---|---|---|---|---|---|---|---|---|---|---|---|---|---|---|---|---|
| 24.3 w/o Al (L-2) | As Ext. (T) | | | | | | | | | 170 | | | | | 3.65 | | | | |
| | As Ext. (L) | | | | | | | | | 172 | | | | | 2.77 | | | | |
| 33 w/o Al (#5) | As Ext. (T) | 1375 | .24 | 1.03 | 3.26 | 233 | 732 | 58.2 | 4.12 | 148 | 12.6 | | | | 3.06 | 33.7 | 76.2 | 82.3 | 4.0 |
| | As Ext. (L) | 1375 | .21 | 1.14 | 4.29 | 184 | 578 | 30.5 | 6.89 | 152 | 19.0 | | | | 2.76 | | | | |
| | 1,125/16 (T) | 1374 | .28 | 1.54 | 3.95 | 182 | 571 | 51.7 | 5.41 | 114 | 11.1 | | | | 2.05 | 33.0 | 63.1 | 69.5 | 5.5 |
| | 1,125/16 (L) | 1374 | .25 | 1.62 | 4.87 | 154 | 485 | 40.0 | 6.25 | 122 | 12.1 | | | | 1.94 | | | | |
| | 1,150/16 (T) | 1376 | .24 | 2.0 | 6.33 | 120 | 376 | 24.5 | 9.8 | 114 | 15.4 | | | | 1.57 | 29.2 | 42.8 | 60.5 | 9.0 |
| | 1,150/16 (L) | 1376 | .24 | 2.14 | 6.78 | 110 | 352 | 24.0 | 10.0 | 118 | 14.7 | | | | 1.47 | | | | |
| | 1,175/16 (T) | 1379 | .21 | 1.91 | 7.18 | 108 | 345 | 26.5 | 7.93 | 118 | 13.0 | | | | 1.64 | 28.3 | 23.4 | 46.4 | 11.0 |
| | 1,175/16 (L) | 1379 | .21 | 1.94 | 7.31 | 108 | 339 | 20.5 | 10.2 | 124 | 16.5 | | | | 1.61 | | | | |
| 35.8 w/o Al (#8) | As Ext. (T) | 1 | .19 | 0.668 | 2.89 | 280 | 880 | 60 | 3.17 | 163.5 | 14.7 | 4.75 | 21.9 | 7.12 | 4.62 | 32.2 | 75.3 | 75.8 | 1.2 |
| | As Ext. (L) | 2 | .31 | 1.11 | 2.46 | 280 | 880 | | | 169.5 | | | | | 2.93 | | | | |
| | 835/16 (T) | 3 | .29 | 1.075 | 2.63 | 270 | 848 | 70 | 4.14 | 157.5 | 12.1 | 3.85 | 11.3 | 3.58 | | | | | |
| | 835/16 (L) | 4 | | | | | | | | 163.7 | | | | | | | | | |
| | 1,125/16 (T) | 5 | .23 | 1.64 | 6.5 | 140 | 440 | 23.5 | 9.8 | 103.5 | 18.7 | 5.97 | 11.4 | 3.64 | 1.91 | 30.0 | 57.8 | 59.3 | 0.4 |
| | 1,125/16 (L) | 6 | .28 | 2.00 | 5.14 | 140 | 440 | 14.5 | 10.3 | 110.3 | 30.3 | 9.65 | 15.2 | 4.83 | 1.57 | | | | |
| | 1,150/16 (T) | 7 | .27 | 1.93 | 5.21 | 140 | 440 | 17.0 | 15.9 | 103.3 | 25.9 | 8.25 | 13.4 | 4.27 | 1.63 | | | | |
| | 1,150/16 (L) | 8 | .29 | 2.07 | 5.07 | 140 | 440 | | | | | | | | | | | | |
| | 1,150/24 (T) | 9 | .25 | 1.92 | 5.77 | 130 | 409 | 13.5 | 18.5 | 112.3 | 30.3 | 9.65 | 15.8 | 5.02 | 1.64 | 27.8 | 42.6 | 53.1 | 9.0 |
| | 1,173/16 (T) | 10 | .26 | 2.0 | 5.7 | 130 | 409 | 15.5 | 16.8 | 103.5 | 26.4 | 8.4 | 13.2 | 4.2 | 1.57 | | | | |
| | 1,180/16 (L) | 11 | .265 | 1.15 | 3.19 | 230 | 724 | 56.0 | 4.73 | 106.5 | 12.9 | 4.1 | 11.2 | 3.67 | 2.73 | | | | |
| | 1,188/3 (T) | 12 | | | | | | | | 128.6 | | | | | | | | | |
| | 1,188/3 (L) | 13 | .26 | 5.2 | 14.8 | 50 | 157 | 1.85 | 140.3 | 81.4 | 84.8 | 27.0 | 16.3 | 5.2 | 0.59 | 27.9 | 22.8 | 39.2 | 6.0 |
| | 1,193/16 (T) | 14 | .27 | 5.4 | 14.7 | 50 | 157 | 2.25 | 120 | 85.9 | 69.8 | 22.2 | 12.9 | 4.11 | 0.58 | | | | |
| | 1,193/ (L) | 15 | | | | | | | | 73.5 | | | | | | | | | |
| | 1,250/4+ (T) | 16 | | 3.5 | 13.2 | 60 | 189 | 3.85 | 54.5 | 75.1 | 49.1 | 15.6 | 14.0 | 4.46 | 0.90 | | | | |
| | 1,250/4+ (L) | 17 | | | | | | | | 85.0 | | | | | | | | | |
| 43.3 w/o Al (#10) | As Ext. (T) | 1377 | .30 | 1.45 | 3.38 | 207 | 650 | 80.7 | 3.72 | 138 | 8.05 | | | | 2.16 | 28.6 | 63.4 | 68.6 | 1.5 |
| | As Ext. (L) | 1377 | .31 | 1.32 | 2.94 | 235 | 739 | 75.7 | 4.10 | 137 | 9.77 | | | | 2.38 | | | | |
| | 1,150/16 (T) | 1378 | .26 | 2.0 | 5.69 | 130 | 408 | 13.2 | 19.7 | 95 | 30.9 | | | | 1.57 | 24.7 | 35.9 | 43.1 | 9.0 |
| | 1,150/16 (L) | 1378 | .29 | 2.74 | 6.7 | 106 | 333 | 9.6 | 30.2 | 88 | 34.7 | | | | 1.15 | | | | |

TABLE VII.—ROLLING DATA FOR Be-Al SHEET PROCESS VARIABLES, HEAT TREATMENT HISTORY, HARDNESS

| Alloy and Specimen No. | Composition, w/o Al | H.T. Before Rolling °F. | H.T. Before Rolling Hrs. | Hardness Before H.T. | Hardness After Rolling | Hardness After H.T. After Rolling | H.T. After Rolling °F. | H.T. After Rolling Hrs. | Furnace Temp., °F. for Rolling | Percent Reduction per Pass Start | Percent Reduction per Pass Finish | Total Reduction, percent | Rolling Direction | Rolling Condition | Roll Speed Sfm. | Work Cycle, Min. | Mill Setting, In. |
|---|---|---|---|---|---|---|---|---|---|---|---|---|---|---|---|---|---|
| 4-6 | 31.4 | None | | | (*) | (*) | 1,175 | 16 | 1,150 | 1.0 | 6.0 | 74 | Long | Bare | 550 | 5 | .001-.003 |
| 7-6 | 36.1 | None | | | 77(78) | 65(69) | 1,175 | 16 | 1,150 | 1.0 | 6.0 | 74 | do | do | 550 | 5 | .001-.003 |
| 9-6 | 43.0 | None | | | 72(73) | | 1,175 | 16 | 1,150 | 1.0 | 6.0 | 74 | do | do | 550 | 5 | .001-.003 |
| 9B | 43.0 | 1,175 | 63 | | 62(59) | 43(42) | None | | 1,150 | 0.5 | 3.0 | 38 | 24% long, 14% trans | do | 520 | 5-10 | .002 |
| 10G | 43.0 | 1,175 | 16 | 38 | 49(48) | None | None | | 1,150 | 0.5 | 3.0 | 22 | 15% long, 7% trans | 1020 Steel Clad | 520 | 5-10 | .002 |
| 5F | 33.0 | 1,150 | 16 | 46 | 47(47) | None | None | | 1,150 | 3.0 | 6.0 | 70 | 37% long, 33% trans | do | 520 | 5.0 | .006-.005 |
| 5G | 33.0 | 1,175 | 16 | 67 | 69(68) | None | None | | 1,150 | 3.0 | 6.0 | 70 | 37% long, 33% trans | do | 520 | 5.0 | .006-.005 |
| 5E | 33.0 | 1,200 | 16 | 68 | 68(65) | None | None | | 1,150 | 3.0 | 6.0 | 70 | 37% long, 33% trans | do | 520 | 5.0 | .006-.005 |
| 8 | 33.8 | None | | 29 | 60(62) | None | None | | 1,150 | 3.0 | 10.0 | 81 | 41% long, 40% trans | 1010 Steel Clad | 520 | 20.0 | .012-.010 |
| 8F | 35.8 | None | | | *(69) | 55 | 1,165 | 16 | 1,150 | 3.0 | 10.0 | 80 | 28% long, 52% trans | do | 520 | 20.0 | .012-.010 |
| 8F | 35.8 | 1,150 | 24 | 61 | 50(67) | 66 | 1,165 | 16 | 1,150 | 3.0 | 10.0 | 79 | do | do | 520 | 20.0 | .012-.010 |
| 8G | 35.8 | 1,175 | 16 | 60 | 56(68) | 57 | 1,175 | 16 | 1,150 | 3.0 | 10.0 | 81 | 33% long, 44% trans | 1010 Steel Clad | 520 | 15.0 | .012-.010 |
| 8E | 35.8 | 1,200 | 16 | 20 | 54(56) | 47 | 1,175 | 16 | 1,150 | 3.0 | 4.0 | 77 | do | do | 520 | 15.0 | .012-.005 |
| 9A | 43.0 | None | | | 56(57) | 41 | 1,175 | 16 | 1,150 | 3.0 | 4.0 | 77 | do | do | 520 | 15.0 | .012-.005 |
| 10F | 43.3 | 1,150 | 24 | 47 | 42(51) | 20 | 1,175 | 16 | 1,150 | 3.0 | 4.0 | 77 | do | do | 520 | 15.0 | .012-.005 |
| 10E | 43.3 | 1,200 | 16 | -2 | 26(36) | 40 | 1,100 | 16 | 1,150 | 2.5 | 5.0 | 68 | do | 1020 Steel Clad | 520 | 5.0 | .012-.015 |
| 5A | 33.0 | 1,200 | 11.5 | 35 | 48 | 59 | 1,175 | 16 | 800 | 2.5 | 5.0 | 59 | Long | Bare | 520 | 5.0 | .003-.002 |
| 5B | 33.0 | 1,200 | 11.5 | 35 | 60 | 58 | 1,175 | 19 | 800 | 2.0 | 4.0 | 30 | Trans | do | 520 | 5.0 | .003-.002 |
| 8A | 35.8 | 1,200 | 11.5 | 27 | 54 | 38 | 1,100 | 16 | 800 | 1.0 | 3.0 | 66 | Long | do | 520 | 5.0 | .003-.002 |
| 8B | 35.8 | 1,200 | 11.5 | 27 | 34(33) | 51 | 850 | 0.2 | 800 | 1.0 | 4.0 | 73 | Trans | do | 520 | 5.0 | .003-.002 |
| 10B | 43.3 | 1,200 | 11.5 | -3 | 17(29) | 32 | None | | 800 | 1.0 | 4.0 | 53 | Trans | do | 520 | 5.0 | .010-.005 |
| 10C | 43.3 | 1,200 | 11.5 | -3 | 27(33) | None | None | | 800 | 1.0 | 4.0 | 52 | 26% long, 26% trans | Copper Clad | 520 | 5.0 | .010-.005 |
| 5D | 33.0 | 1,250 | 16 | 35 | 43 | None | 1,175 | 16 | 800 | 1.0 | 15.0 | 82 | 55% long, 27% trans | do | 520 | 5.0 | .010-.005 |
| 10D | 43.3 | 1,250 | 16 | 27 | 39 | None | None | | 800 | 1.0 | 15.0 | 84 | 56% long, 28% trans | do | 520 | 5.0 | .010-.005 |
| 10D | 43.3 | 1,250 | 16 | -3 | 45 | None | None | | 800 | 1.0 | 15.0 | 85 | 57% long, 28% trans | do | 520 | 5.0 | .010-.005 |

*Hardness taken 50 days after first value listed.

TABLE VIII.—SUMMARY OF TENSILE DATA FOR Be-Al SHEET ROLLED FROM 1,150° F.

| Material Description | Actual Percent Al Comp. | Gauge In. | H.T. Prior To Rolling °F. | H.T. Prior To Rolling Hrs. | Rolling Direction, Percent Reduction Long. | Rolling Direction, Percent Reduction Trans. | H.T. After Rolling °F. | H.T. After Rolling Hrs. | Longitudinal Properties E, 10⁶ p.s.i. | Longitudinal Properties T.Y.S., K.s.i. | Longitudinal Properties T.S., K.s.i. | Longitudinal Properties Percent Elong. | Transverse Properties E, 10⁶ p.s.i. | Transverse Properties T.Y.S., K.s.i. | Transverse Properties T.S., K.s.i. | Transverse Properties Percent Elong. |
|---|---|---|---|---|---|---|---|---|---|---|---|---|---|---|---|---|
| 31% Al— | | | | | | | | | | | | | | | | |
| As Rolled: 4-6-1 | 31.4 | .020 | None | | 75 | | None | | 30.4 | 67.4 | 79.1 | 4.6 | | | | |
| Annealed: 4-6-2 | 31.4 | .020 | None | | 75 | | 1,175 | 16 | 29.8² | 41.0 | 61.1 | 6.5 | | | | |
| 36% Al— | | | | | | | | | | | | | | | | |
| As Rolled: 7-6-4 | 36.1 | .020 | None | | 75 | | None | | 27.3⁴ | 59.5 | 69.7 | 8.0 | 25.6 | 44.5 | 54.0 | 2.3 |
| 8F | 35.8 | .040 | 1,150 | | 27 | 54 | None | | 26.8 | 48.8 | 60.3 | 6.2² | 26.4 | 39.0 | 44.5 | 1.0 |
| 8G | 35.8 | .040 | 1,175 | | 27 | 54 | None | | 28.4 | 45.4 | 46.3 | 6.2² | 26.9 | 38.4 | 39.1 | 0.2 |
| 8E | 35.8 | .040 | 1,200 | | 27 | 54 | None | | 28.5 | 42.9 | 52.8 | 5.0 | | | | |
| Annealed: 7-6-4 | 36.1 | .020 | None | | 75 | | 1,175 | 16 | 27.9² | 37.1 | 55.4 | 8.0 | 26.2 | 37.0 | 45.2 | 3.2 |
| 8F | 35.8 | .040 | 1,150 | | 27 | 54 | 1,175 | 16 | 27.9 | 39.2 | 51.6 | 5.5 | 26.9 | 36.0 | 45.0 | 2.5 |
| 8G | 35.8 | .040 | 1,175 | | 27 | 54 | 1,165 | 16 | 28.6 | 39.9 | 51.6 | 4.0 | 25.5 | 33.8 | 36.0 | 0.3 |
| 8E | 35.8 | .040 | 1,200 | | 27 | 54 | 1,165 | 16 | 28.0 | 37.0 | 47.5 | 4.5 | | | | |
| 43% Al— | | | | | | | | | | | | | | | | |
| As Rolled: 9-6-4 | 43.0 | .020 | None | | 75 | | None | | 25.8⁴ | 55.0 | 64.2 | 12.0 | 27.2¹² | 37.2² | 47.9² | 8.0 |
| 9A | 43.0 | .050 | None | | 25 | 50 | None | | 24.2⁶ | 36.8 | 44.4 | 4.0 | 28.2¹² | 30.2² | 40.2² | 7.5 |
| 10F | 43.3 | .050 | 1,150 | | 25 | 50 | None | | | | | | 25.2 | 27.2² | 32.0 | 2.4 |
| 10E | 43.3 | .050 | 1,200 | | 25 | 50 | None | | | | | 13.0 | | | | |
| Annealed: 9-6-6 | 43.0 | .020 | None | | 75 | | 1,175 | 16 | 24.6² | 32.6 | 50.3 | | 24.8¹² | 29.4 | 36.5 | 3.0 |
| 9A | 43.0 | .050 | None | | 25 | 50 | 1,175 | 16 | | | | | 23.4¹² | 26.4 | 38.8 | 9.1 |
| 10F | 43.3 | .050 | 1,150 | | 25 | 50 | 1,175 | 16 | | | | | 23.2¹² | 23.2 | 31.4 | 5.3 |
| 10E | 43.3 | .050 | 1,200 | | 25 | 50 | 1,175 | 16 | | | | | | | | |

NOTE.—Superscript=Number of tests. D=Defect in fracture.

It is noted that the room temperature modulus values from Tables I and II are plotted, with prior art data, as a function of weight-percent beryllium in FIGURE 1. Comparison between the moduli obtained in the alloys of the invention and that of a prior art chilled casting (at about 70 weight percent beryllium) shows the new alloys to be at least approximately $5 \times 10^6$ p.s.i. higher. (In the case of the slow cooled sand casting the new alloys are approximately $15 \times 10^6$ p.s.i. higher in modulus.) Considering the modulus of alloys containing 67.5 to 70 weight percent beryllium to be essentially equal, it can be presumed that the beryllium "particle" size and complexity control the modulus. Since the slow-cooled sand casting would have the largest "particle" size, the chilled casting would have the next largest "particle" size, and the rapidly quenched starting materials for the new alloys would have the smallest particle size, a correlation can be presumed to exist between decreasing particle size (and increasing complexity) and increasing modulus.

*Example of production of Be-Al "Lockalloys"*

According to the teachings of our invention, the initial Be-Al materials obtained in accordance with the teachings of the examples set forth above are preferably placed in a can and subjected to cold compression. This step is preferably followed by a hot outgassing under vacuum which is then followed by a hot compaction step which may be a part of the extrusion operation. The so produced extrusions may then be heat treated at temperatures below 1193° F. Applicants have found that they can, through these steps, effectively control and *change* the modulus of elasticity and ductility of a given alloy. After extrusion, the material may be rolled in accordance with our invention for producing sheets. This rolling operation takes place after the material has been "solution" heat treated followed by rolling which results in *further* improvement in Young's modulus. It is noted that the normal expectation would be for the material to exhibit *no* significant in Young's modulus. Specific examples follow:

EXAMPLE IV

Coated powder was compacted in a container or can of carbon steel. (If the aluminum content is above 30% by weight, compaction may be carried out at room temperature under pressure in the range of 30 to 60 tons per square inch. However, if the aluminum content is less than 30% by weight, it is preferred that the compaction be performed at an elevated temperature of approximately 1000° F. This temperature is not critical as long as melting is prevented.) Pressure was applied through a ram and piston at temperature for a time sufficient to attain at least 97% densification. A period of 10 to 20 minutes has been found to be adequate, the exact time depending upon composition and temperature, with the required time being longer at lower temperatures and/or lower aluminum content of the powder. This hot compaction may also be performed directly in a suitable lubricated alloy or steel die, in which event the compacted billet or ingot is inserted or pressed into the can after ejection from the die. The can was then closed with a tight-fitting cover having an outlet into a vacuum. The can containing the billet or ingot was then welded tight on all seams, evacuated, and sealed off at the vacuum outlet. It was then heated to the desired extrusion or rolling temperature in conventional furnace equipment. The temperature must in no event exceed the eutectic temperature in the beryllium-aluminum system, and preferably is on the order of about 800° to 1,050° F., depending upon the alloy to be extruded, the die shape, and extrusion speed to be used. This so heated canned billet or ingot was then inserted into the billet chamber of an extrusion press. Extrusion was carried out with a reduction of approximately 15 to 1 with the canning material being co-extruded with the beryllium-aluminum alloy. The extruded product may be further worked and consolidated by hot rolling. In that event the canning material may be removed by mechanical or chemical means prior to the hot rolling step. The characteristics of material produced in accordance with this example are set forth in FIGURE 12. It can be seen that heat treated alloys containing approximately 60–61% beryllium exhibit a Young's modulus of $26.8 \times 10^6$ p.s.i. to $27.8 \times 10^6$ p.s.i.

EXAMPLE V

Under the heading of "Example V," applicants have set forth a large number of test samples (L–1 to L–9) of two specific alloy compositions (24.3 and 31.2 weight percent Al) which have been produced according to the conditions shown in Table IV. Results, i.e., mechanical properties and densities of some of these alloys are shown in Table I. It should be noted that all of the starting materials referenced in Table IV were produced according to the teachings set forth in Example III above (except Lockalloy 20, which was made according to Example II). By way of illustration and referring to Table IV, applicants note that Lockalloy "L–2," containing 24.3 weight percent of Al, was cold compacted at 48 tons per square inch in a 16 gauge steel can. The alloy was, as indicated, evacuated and sealed, but not hot compacted, as a separate operation. After the sealing operation it was heated in the "canned" condition to 1,050° F. and was then extruded at a ram speed of 15 inches per minute with a reduction ratio of 14½–1 to produce a .525 in. diameter rod. The cans were stripped from the extruded alloy and two samples of this particular material as shown in Table I exhibited a Young's modulus, at room temperature, of $37.0 \times 10^6$ and $38.0 \times 10^6$ p.s.i. Tensile yield strengths were 72.3, and 76.8 thousand p.s.i., respectively, and tensile strengths were 81.0 and 87.6 thousand p.s.i. Elongations were 2.0 and 2.6% based on these test specimens which had a gauge length of 2 inches.

EXAMPLE VI

This example sets forth a number of alloys (4, 5, 7, 8, 9 and 10) which were made per Example III which were subjected to the operations noted in Table IV. Mechanical properties are set forth in Table II. This Table II also shows the results of heat treatment as it affects the mechanical properties of these alloys. Also shown are some typical properties obtained on substantially pure beryllium extrusions. Typically, "Lockalloy 5" containing 33.0 weight percent aluminum was cold compacted in a 16 ga. steel can using 28.4 tons/sq. in. The compacted material and can were heated at 900° F. under vacuum until completely degassed and the can sealed. The thus canned materials was then heated at 1,000° F. for 1½ hours and hot compacted at 85 tons sq. in. The steel can was removed and the alloy billet placed in a tight fitting 16 ga. copper can and heated at 1.025° F. for approximately 2 hours. The heated billet was then placed in a linear (heated to 800° F.) of an extrusion press and the canned material extruded at a ram speed of 20 inches per minute, and a reduction ratio of 19½–1 to produce a flat strip 1½" wide x ¼" thick. The properties of several samples of this material are shown in Table II, and in the case of the 33.0 wt. percent Al alloy, show a Young's modulus of from 28.3 to $33.7 \times 10^6$ p.s.i. and a percent elongation of 4% to 11%. It will be noted that the effects of the 1,150° F. heat treatment are particularly beneficial and result in improvements of *two* to *six* times the bend angle of the "as extruded" material.

EXAMPLE VII

This example illustrates a series of experimental alloys which were made under somewhat different conditions as shown in Phase III of Table IV.

Typically, for example, alloy #36844 produced in accordance with the teachings of Example III above contained 31.4% (by weight) of aluminum, with the remainder comprising substantially completely beryllium, was cold compacted at 57 tons per square inch. The material was then "canned" in a 16 ga. steel container and was heated for 8 hours at approximately 900° F., under vacuum, to degas the material. The can was sealed while still under vacuum and was then heated for approximately two hours at 1,000° F. and hot compacted using a pressure of 113 tons per square inch. The steel can was then removed, the billet machined to provide a good fit for a 2.50 inch (I.D.) copper can having a one-inch thick copper nose machined at the front into a 60° included angle conical shape. The billet was then heated in the can at 400° F. for thee hours under vacuum, and then sealed. The billet was then heated at 870° F. for approximately 2½ hours and placed in an extrusion press, the extrusion liner and die of which had previously been heated to 725° F., and extruded at a ram speed of 13 inches per minute and a reduction ratio of 21–1 at a pressure of 400–430 tons to produce an I beam extrusion of the indicated dimensions. This alloy had a modulus of elasticity of $35.2 \times 10^6$ p.s.i.

It will be seen from the dicussion set forth hereinbelow in interpretation of the figures that applicants have provided beryllium-aluminum alloys which can be successfully formed into sheet and which have markedly improved ductility and bend properties. Moreover, there is a decrease of only approximately 34% in the elastic weight index (density divided by the square root of the modulus) as compared to beryllium.

Extrusions from "flake" type powders generally possess the following range of tensile properties, it being noted that aluminum content ranges between 24.3% to 43.3% by weight in various heat treatment conditions and includes tests both at "room" and at elevated temperatures (see Tables I and II):

Mod. of elasticity: $23.3 \times 10^6$ to $38 \times 10^6$ p.s.i.
Tensile strength: 35 to 87.6 k.s.i. (k.s.i. equals 1000 p.s.i.)
Tensile yield strength: 19.4 to 84.7 k.s.i.
Elongation: Up to 11%

Extrusions from powder mixtures containing approximately 40% aluminum have $1.7 \times 10^6$ to $2.7 \times 10^6$ p.s.i. lower modulus than extrusions made from "flake"-type powders of similar composition.

Young's modulus and strength increased for the Lockalloys approximately linearly with increasing beryllium content while elongation changed little with composition as shown in FIGURES 8 and 12. High temperature heat treatments near the eutectic temperature increase elongation as much as 5 to 9 percent and increase the bend angle as much as sixfold while decreasing strength 20,000 to 35,000 p.s.i. The modulus uniquely decreases by about $5 \times 10^6$ p.s.i. as illustrated in FIGURES 9, 10, 11 and Table II, thus pointing up applicants' ability to preselect and control desirable combinations of Young's modulus and ductility that may be required to suit specific applications.

While applicants have not attempted to thoroughly investigate the weldability of Lockalloys, preliminary attempts to electron-beam weld "as extruded" beryllium—36.1 weight percent aluminum alloys have produced weld strengths of 34 and 34.5 k.s.i. (45% efficiency based on the tensile strength of "as extruded" metal and 65% based on the tensile strength of metal annealed for 16 hours at 1150° F.). In addition, weldability of the new alloy sheet is illustrated by the fact that alloy numbers 36843-2 and -3 (see Table IV) gave average weld strength of 82.8 thousand p.s.i. resulting in a weld efficiency of 56% for the "as rolled" sheet. Welds on heat treated sheet gave an average weld strength of 44.9 thousand p.s.i. compared to average base metal strength of 52.6 thousand p.s.i. yielding a weld efficiency of 85% for the heat treated sheet.

Also, the new alloys exhibit markedly superior riveted joint strengths as compared to cross rolled beryllium sheet. For example, a 0.050" thick sheet of Lockalloy (Be–31.4% Al), 2.250" wide was fastened with 3³⁄₁₆" diameter titanium screws on ¾" centers to 0.10" magnesium sheet and tested against a similar configuration of cross rolled beryllium sheet. The new alloys resulted in a net tensile strength of 48,000 p.s.i., whereas the best commercially available beryllium joint attained was only 35,000 p.s.i.

FIGURE 13 deals with the elastic weight index of the new alloys, it being noted that elastic weight index is a measure of the material's ability to withstand elastic compressive loading without buckling. The values shown for certain magnesium and aluminum alloys also demonstrate the superiority of the alloys of the present invention.

Generally, heat treating the alloy extrusions from 1125° F. to less than the eutectic temperatures, 1193° F., for 16 hours, reduces the elastic modulus and strength and beneficially increases the ductility. Longer times at lower temperatures would probably produce the same effect. The same high temperature heat treatments at 1150° to 1175° F. used prior to rolling not only reduce the strength and modulus, but also the elongation in rolled sheet. This reduction in the elongation of sheet as compared to extrusions is attributed to strain-aging during rolling or heating to the rolling temperatures. FIGURES 30 and 31 show effect of heat treatment prior to rolling of sheet on various properties.

Again referring to Table II and FIGURE 8, it is noted that increasing aluminum content in the "as extruded" Lockalloys decreases modulus and strength and increases bend angle slightly. High temperature heat treatments (1125° F. to less than 1193° F. for sixteen hours) also cause decreases in strength, increases in ductility (as measured by elongation and bend angle) and unusual and unexpected decreases in Young's modulus. One would normally expect Young's modulus to remain constant. These results suggest that the best combination of mechanical properties in extrusions can be obtained by heat treating alloys with 33 weight percent aluminum or less. Heat treatment temperatures should, of course, be less than 1193° F. to avoid melting and would be selected on the basis of the combination of Young's modulus and the ductility desired. If a relatively low ductility is satisfactory, then Lockalloys can be processed to attain the highest values of Young's modulus and vice versa. FIGURE 29 shows effect of composition and heat treatment on tensile properties for sheet.

FIGURE 23 contains detailed bend data, including a comparison between beryllium-aluminum extrusions and cross rolled beryllium sheet, and bend specimen deflections as a function of width/thickness ratio for various alloys and conditions. FIGURE 24 shows the relationship of bend angle to percent elongation for the alloys of instant invention.

Four series of heat treatment studies were made on the extruded alloys to determine the conditions which could be used to soften the alloys prior to rolling. The hardness results obtained from these studies are shown in FIGURES 25 and 26 with additional data in FIGURES 27 and 28. It is apparent, comparing FIGURES 25 and 26, that considerable softening can be obtained with the 16-hour heat treatment without danger of melting which would be present when trying to obtain the same softening using a 30-minute heat treatment. Both figures show that a precipitous drop in hardness is associated with the eutectic temperature, 1193° F. The effect of exposure time at 1150° F. and 1060° F. on hardness is shown in FIGURES 27 and 28, respectively. At 1150° F. the hardness decreases at a high rate during the first hour and at a lower rate thereafter. At 1060° F. it takes approximately six hours to obtain the same decrease in hardness obtained in one hour at 1150° F.

*Test procedures*

The Baldwin-Wiedemann Snap-On Non-Averaging Microformer, Model T2M Extensometer attached to an Instron testing machine was used in measuring both tensile yield strength and Young's modulus. A gage length of one inch was generally used for the extrusion specimens and one-half inch for sheet specimens.

The load and strain measuring systems were calibrated at least daily during the test program and more often when any inconsistencies were noted in values of Young's modulus. The strain measuring system was adjusted by means of a recorder span control to give the best accuracy obtainable at 0.001 inch displacement (at 1000 magnification) as provided by a Templin calibrator. Strain calibration curves were then made and used to correct the recorded load-strain curves. This procedure permitted strain measuring accuracies which were better than would ordinarily be obtained using an ASTM Class B–1 Extensometer calibrated in the conventional manner.

Determination of Young's modulus was always made by averaging the results of multiple tests, generally 4 to 12 tests, on a single specimen. Strain measurements were made on successive tests, alternating the gage from one side to the other, without complete unloading of the specimens between tests to prevent the specimen from reseating in the grips.

Elongation measurements were taken from the load strain curves, whenever possible, making a correction for the elastic contraction. When the elongation exceeded the range of the extensometer, the extension was taken from gage marks on the broken specimen with dividers and measured to the nearest 0.005 inch.

Free bend tests were made on equipment built by applicants by loading simple beams at their midpoints and autographically recording the load and strain simultaneously. The test specimens, two inches long by ¼ inch to 1¼ inches wide, were supported on blunt 90° fixed knife edges, 1.50 inches apart, while the loading mandrel with a 1/32 inch radius was forced against the midpoint of the beam by a motor-driven screw, an X–Y recorder was used to record load as the output of SR–4 gages on a load beam and to measure deflections as the output of a linear variable differential transformer (LVDT).

*Quantitative metallography (explanation and definition of basic terms used in this application)*

Basically, four measurements are made from the photomicrographs included in the figures in this specification:

$V_v$, the volume fraction, obtained by applying a rectangular grid, randomly, to a photomicrograph. The average number of grid intersections (points) falling over the phase or area of interest is determined for each position of the grid. The ratio of the number of points "over" the phase ($N_{phase}$) divided by the total number of points in the grid ($N_{total}$), gives the volume fraction of that phase, i.e., $$V_v = \frac{N_{phase}}{N_{total}}$$

$N_L$ is the mean number of intersections made per unit length of a randomly applied straight line (drawn on a photomicrograph) with the interface boundary traces.

$P_L$ is the mean number of beryllium-rich areas intercepted per unit length of a randomly applied line and is obtained simply by counting the number of beryllium-rich areas crossed over by the straight line. This number is effectively one-half the value of $N_L$ and is independent of whether the microstructure consists of dispersed, spherical particles or jagged, interconnected phase networks such as are frequently seen in the Lockalloys.

$(N_A)_{Al}$, the mean number of isolated aluminum-rich "islands" per unit area of microstructure, is obtained by counting the number of aluminum-rich areas, regardless of complexity, within a certain portion of the photomicrograph.

The above quantities give the basic data from which all subsequent calculations are made. Derived parameters that are rigorously correct and independent of any special assumptions of shape and size, etc., and which depend only on adequate statistical sampling and measurements may be listed as follows:

$\lambda$ = the mean free intercept distance between beryllium-rich areas
$D$ = the mean intercepted "diameter" across the beryllium-rich areas
$L_A$ = the length of interface boundary traces per unit area on a photomicrograph
$L_p$ = the mean perimeter length on a photomicrograph of the isolated aluminum-rich islands
$a$ = the means on a photomicrograph of isolated aluminum-rich "islands"

The mean free distance across the Al matrix is calculated from the general equation $$\lambda = \frac{1-(V_v)_{Be}}{P_L}$$

which is independent of any special assumptions. In the case of Be-Al alloys where the beryllium is frequently interconnected, $\lambda$ is the mean edge to edge distance between the hard beryllium-phase (regardless of the degree of coalescence or spheroidization of the beryllium). $V_v$ is the volume fraction of the beryllium phase, and $P_L$ is as defined above. $D$ is the mean intercept length, or path, across the Be phase regardless of complexity. (If only convex particles were being considered, $D$ would be the customary mean *intercept* diameter.) The mean intercept diameter, $D$, is obtained without assumptions as follows: $P_L$ is the number of beryllium areas intercepted per unit length, so $1/P_L$ is the mean spacing of the beryllium phase, $S_p$. This spacing is akin to the mean center-to-center length between beryllium particles. Since $\lambda$, the mean free distance, is the mean edge-to-edge distance, then $D = S_p - \lambda \cdot D$ is obtained by this equation, or by substitution from the other equations.

The next quantity, $L_A$, is related simply to $N_L$ by the exact equation $$L_A = \frac{\pi}{2} N_L$$

It will be recalled that $N_L$ is obtained by doubling the $P_L$ count, since essentially two interfaces must be traversed for every particle crossed.

The mean area, $a$, of the isolated Al islands is related to the reciprocal of $(N_A)_{Al}$, the number of islands per unit area, through the expression $$a = \frac{(V_v)_{Al}}{(N_A)_{Al}}$$

The volume fraction term enters because we are not dealing with single phase alloys. The mean perimeter length per aluminum island, $L_p$, is given by $$L_p = \frac{L_A}{(N_A)_{Al}}$$

since the total interface boundary trace, divided by the number of islands gives the mean trace length per island.

*Shape sensing parameters*

An "index" was developed in order to further characterize the structures. This "Complexity Index" (C.I.) is defined as the ratio of the mean perimeter length per aluminum-rich island to their mean area and is expressed as follows:

$$C.I. = \frac{L_p}{a}$$

It is noted that $L_p$, a linear quantity, is expressed in microns, $\mu$, and $a$, an area quantity, is expressed in square microns $\mu^2$. Thus the C.I., for purposes of this description, is properly expressed in terms of $1/\mu$, or reciprocal microns, $\mu^{-1}$. This index expresses the complexity of the interface through $L_p$, and takes the size of the aluminum-rich islands into account through $a$. Complexity index is used as a quantitative measure of the degree of jaggedness or irregularity of the interface between the beryllium-rich and aluminum-rich phase.

The new alloys are characterized as having a C.I. of between approximately 1 and approximately 5, it being noted that Be-Al alloys having C.I.'s falling substantially outside this range would be essentially useless for purposes of satisfying the objects of this invention. Manifestly, our alloys having high strength and modulus of elasticity would have a more complex interface between the phases and would be characterized by a higher C.I. toward the upper end of the noted range, while lower strength alloys having greater ductility (which may be paramount for certain applications) would approach the lower end of the range.

It is noted that in our present *rolled* alloys, a C.I. between 1 and 2 has been obtained, with the figures indicating that improvements in strength may be obtained in rolled alloys with greater interface complexity.

FIGURE 14 exemplifies the application of the terms $D$, $\lambda$, $L_p$ and $a$ in an alloy composed of 35.8% Al. In this example the 1,000 magnification photomicrograph shows each of the aforementioned parameters graphically.

FIGURES 15 and 32 summarize the values of $D$ and $\lambda$ for extruded and rolled alloys which have been annealed up to and slightly past the eutectic temperature of 1193° F. The changes are relatively slow until 1193° F. is reached, whereupon a 2 to 3-fold increase in $D$ and $\lambda$ occurs. Most practical interest has centered about annealing temperatures slightly below the eutectic; however, there is some evidence showing that equivalent values of $D$ and $\lambda$ can be obtained by longer anneals at lower temperatures. For example, an extruded specimen annealed at 1188° F. for 20 minutes has properties near to alloys annealed at 1125° F. for 16 hours. The ability to trade time for temperature enhances the usefulness of these versatile alloys.

FIGURE 16 shows correlation curves between hardness and modulus or yield strength. The correlation curves reveal the usual trend. A scatter of data points indicate more the lack of multiple test results than any inherent differences between these properties. Hence, it is felt by the applicants that hardness values may be used to augment the modulus and tensile values.

FIGURE 17 reveals the variation of hardness with mean free distance, $\lambda$, for extruded alloys with and without an anneal. Compositional effects are noted whereby discrete hardness levels are obtained for different alloy compositions. It is seen that the greatest change in hardness occurs at spacings between 1 and 2 microns. The corresponding yield strengths are about 30 to 75 k.s.i. Moreover, it is of interest that elongations of up to 11% fall within this range of spacings.

Whereas, the curves of FIGURE 16 are relatively independent of composition, this does not appear to be true in the case of the curves of FIGURE 17.

FIGURES 18 and 19 pertain to elongation behavior. Again, there is more scatter in values for the rolled alloys than the extruded. A good correlation is seen with respect to FIGURE 18 where elongation is plotted versus $L_A$ for extruded alloys. Apparently the extent of interface surface is controlling or is an appreciable factor in the ductility of extruded alloys subjected only to simple annealing treatments. Also, the mean particle diameter, $D$, does an excellent job of correlating the ductility in FIGURE 19. Both the complexity index and the mean free distance, $\lambda$, show fair correlations for the extruded alloys.

FIGURES 20, 21, and 22 summarize pertinent results obtained by means of this complexity index. FIGURE 20 gives the variation of hardness in extruded alloys as a function of the complexity index. There is a relatively slow rise at low values (C.I. between 0 and 1.5) and a fairly rapid rise (C.I. between 1.5 and 2.5) followed by a levelling off (at greater values of C.I.). This set of curves reveals that as the structure becomes more complex, the hardness increases as one would expect. The important point, however, is that the region between a C.I. of 1.5 and 2.5 gives the greatest increase in hardness, so here is where one would look for the optimization of strength and ductility. Also the maximum values of hardness are obtained near a C.I. of 3, in case strength is the overriding consideration.

FIGURE 21 verifies the conclusions drawn from the previous figure, but for yield strength and moduli of extruded alloys. The steep rise and maximum values are clearly revelealed, again confirming the desirability of a C.I. of 3. The highest three points all belong to the unannealed (extruded) alloys with the most complex structures.

As the strength falls, the complexity index decreases. These curves are remarkable in that they are apparently independent of composition. Thus, a way has been found of specifying an optimum structure without requiring a specific composition or heat treatment in great detail.

The situation with respect to the rolled alloys is seen in FIGURE 22. The same type of curve as established for the extruded alloys is valid here, thus substantial improvement in Young's modulus can be expected in rolled alloys with larger values of C.I. This possibility may be achieved by heat treatment at lower temperatures for longer times, in an effort to preserve the original structural complexity as much as possible.

Mean particle diameter, $D$, and the mean free distance, $\lambda$, increase slowly with increasing annealing temperatures from about 3 to 6 microns and from about 1 to 2 microns, respectively. When the eutectic temperature is reached, there is a sharp discontinuous increase in both $D$ and $\lambda$ by a factor of 2 to 3 (FIGURE 15).

Summarizing, as $D$ (or $\lambda$) increases, the hardness, tensile strength, and modulus of extrusions decrease, while the elongations correspondingly increase. A good correlation exists in extruded alloys for elongation versus $D$ and versus the complexity index which is a measure of the jaggedness or irregularity of the beryllium-aluminum interface. Of special interest are the single-valued curves of modulus or yield strength versus C.I. in extruded Lockalloys. The maximum at C.I.=3 indicates the desirable microstructural condition for greatest strength.

An area of major interest lies in the strain hardening propensities of the Lockalloys disclosed herein. Although the equilibrium solubilities are slight, the combination of rapid solidification rates and high annealing temperatures may permit appreciable intersolubility of beryllium and aluminum to take place. Age hardening reactions are well-known in aluminum binary alloys. Also several papers have been written on age hardening reactions in impure beryllium. Thus, in the present alloys, containing normal amounts of impurity elements, there are distinct possibilities for age hardening to occur. Large increases in hardness of rolled and annealed alloys have been noted after several weeks at room temperature. The effect is not noted particularly in extruded or extruded and annealed alloys so the additional straining applied during hot rolling but subsequent to a high temperature solution heat treatment, i.e., about 1150–1192° F. appears to be an essential factor.

The possibility of strain aging is attractive because alloys could be fabricated in the soft condition, then given the aging treatment prior to use. It should be feasible to optimize fabrication and heat treatment schedules so as to take full advantage of this additional hardening.

Preferred alignment of matrix and particles in both our rolled and extruded alloys is common, yet the structures in both cases are distinctly different. In the "as extruded" state the hard beryllium phase has an extremely jagged irregular elongated structure (see FIGURES 4 and 5). In the rolled condition, especially after high temperature anneals, the beryllium assumes a smoothly elongated laminar shape. When either the rolled or extruded structures are annealed sufficiently long or at high enough temperatures, the shape of the beryllium phase progresses toward a rounded inter-connected skeletal structure penetrated by aluminum channels.

Having thus described our invention, we desire to be limited only by a broad interpretation of the attached claims wherein we claim:

1. Beryllium-aluminum alloys consisting essentially of at least 50% by weight of beryllium with the remainder being primarily aluminum which have a complexity index within the range of from approximately 1 to approximately 5.

2. Beryllium-aluminum alloys consisting essentially of at least 50% by weight of beryllium with the remainder being primarily aluminum which have a complexity index within the range of from approximately 1 to approximately 3.

3. Beryllium-aluminum alloys consisting essentially of at least 50% by weight of beryllium with the remainder being primarily aluminum which have a complexity index of approximately 3.

4. Beryllium-aluminum alloys which contain at least 50% by weight of beryllium with the remainder being primarily aluminum which have a complexity index of between approximately 1 and approximately 3 and which have a modulus of elasticity of at least approximately 24,000,000 p.s.i.

5. Beryllium-aluminum alloy sheet which contains at least 50% by weight beryllium with the remainder being primarily aluminum which has a high ductility as represented by a bend angle in .020″ or less thick sheet of more than 70°.

6. Beryllium-aluminum alloy extrusions which contain at least 50% by weight beryllium with the remainder being primarily aluminum which have a high ductility as represented by a bend angle in .057″ thick or less extrusion of at least 40°.

7. Beryllium-aluminum alloys consisting essentially of at least 50% by weight of beryllium with the remainder being primarily aluminum which are characterized by possessing a modulus of elasticity that may be selectively and substantially altered within a range of about $5 \times 10^6$ p.s.i.

8. Wrought beryllium-aluminum alloys consisting essentially of at least 50% by weight beryllium with the remainder being primarily aluminum which are characterized by having a modulus of elasticity of at least about 24,000,000 p.s.i.

9. Wrought beryllium-aluminum alloys consisting essentially of at least 50% by weight beryllium with the remainder being primarily aluminum which are characterized by having a modulus of elasticity of at least 24,000,000 p.s.i. and a substantial ductility as represented by a percent elongation of at least 1%.

10. Wrought beryllium-aluminum alloys consisting essentially of at least 50% by weight beryllium with the remainder being aluminum which are characterized by possessing a modulus of elasticity that may, by heat treatment, be selectively and substantially varied in the range of approximately 38,000,000 p.s.i. and approximately 24,000,000 p.s.i.

11. Beryllium-aluminum alloys consisting essentially of at least 50% by weight of beryllium with the remainder being primarily aluminum, which are characterized by a distinctive microstructural appearance in which the beryllium-rich phase is present in the form of generally particulate, irregularly shaped networks which are interspersed by the aluminum-rich phase, the mean free intercept distance, λ, across the aluminum-rich phase being in a range of from approximately 1 to approximately 6 microns and in which the mean intercept diameter, D, across the beryllium-rich phase is in a range of from approximately 3 microns to approximately 16 microns.

12. Beryllium-aluminum alloys consisting essentially of at least 50% by weight beryllium with the remainder being primarily aluminum which are characterized by a distinctive microstructural appearance in which the beryllium-rich phase is present in the form of irregular, generally particulate irregularly shaped networks which are interspersed with the aluminum-rich phase which have a complexity index of between approximately 1 and approximately 5 and which have a mean intercept diameter, D, across the beryllium-rich phase of approximately 3 microns to approximately 16 microns, and in which the mean free intercept distance, λ, across the aluminum-rich phase, ranges from approximately 1 to approximately 6 microns.

13. The method of making beryllium-aluminum base alloys which contain at least 50% by weight beryllium with the remainder being primarily aluminum which are characterized by their ability to undergo selective and substantial change in modulus of elasticity and ductility which comprises the steps of providing a starting material in the compositional range set forth above which is selected from the group consisting of fine aluminum coated beryllium powder and small particles of beryllium-aluminum alloy, compacting said particles under pressure, outgassing said compacted material, and pressing said material into the form desired, all of said operations taking place at a temperature below 1193° F.

14. The method of making beryllium-aluminum base alloys as claimed in claim 13 in which said starting material, after outgassing and before pressing into the desired shape, is heat treated at a temperature of less than 1193° F. preferably for a period of from 12 to 30 hours.

15. The method of making beryllium-aluminum base alloys as claimed in claim 14 which includes heating the resultant material for a time and in a temperature range extending between approximately 32 hours at 1100° F. to a few minutes at just under 1193° F., and then rolling said material at a rolling temperature below 1193° F.

16. Beryllium-aluminum alloy sheet which contains at least 50% by weight beryllium with the remainder being primarily aluminum which is characterized by a distinctive microstructure in which the beryllium-rich phase is present in the form of generally particulate shapes which are interspersed by the aluminum-rich phase, and which has a complexity index between approximately 1 and approximately 2.

17. The method of making beryllium-aluminum base alloys of substantially improved strength and ductility and which contain at least 50% by weight beryllium with the remainder being primarily aluminum which comprises the steps of melting a quantity of substantially pure beryllium and substantially pure aluminum in the percentage range desired, "atomizing" said melt to form small particles of beryllium-aluminum alloy, rapidly quenching said Be-Al particles, compacting said particles to form a substantially solid billet, outgassing said billet, heat treating said billet at a temperature preferably above 1100° F., but below 1193° F., and extruding the heated billet into the shape desired.

18. The method of making beryllium-aluminum base alloys as claimed in claim 17 comprising the further step of annealing said extruded material for a time and in a temperature range extending between approximately 32 hours at 1100° F. to a few minutes at just under 1193° F., and rolling said extrusion into a sheet of desired thickness.

References Cited
UNITED STATES PATENTS

| | | | |
|---|---|---|---|
| 1,254,987 | 1/1918 | Cooper | 75—150 |
| 1,976,375 | 10/1934 | Smith | 75—150 |
| 2,244,608 | 6/1941 | Cooper | 75—150 |
| 3,147,110 | 9/1964 | Foerster | 148—11.5 |
| 3,172,761 | 3/1965 | Beaver et al. | 75—160 |

DAVID L. RECK, *Primary Examiner.*

RICHARD O. DEAN, *Assistant Examiner.*